(12) United States Patent
Kato et al.

(10) Patent No.: US 9,772,680 B2
(45) Date of Patent: Sep. 26, 2017

(54) IMAGE PICKUP APPARATUS, PORTABLE TERMINAL, IMAGE PICKUP METHOD AND STORAGE MEDIUM

(71) Applicant: CASIO COMPUTER CO., LTD., Shibuya-ku, Tokyo (JP)

(72) Inventors: Yoshiyuki Kato, Higashiyamato (JP); Toshiya Kiso, Hamura (JP); Hiroshi Suzuki, Akiruno (JP)

(73) Assignee: CASIO COMPUTER CO., LTD., Tokyo (JP)

(*) Notice: Subject to any disclaimer, the term of this patent is extended or adjusted under 35 U.S.C. 154(b) by 88 days.

(21) Appl. No.: 13/918,532

(22) Filed: Jun. 14, 2013

(65) Prior Publication Data
US 2013/0335584 A1  Dec. 19, 2013

(30) Foreign Application Priority Data

Jun. 15, 2012  (JP) ................................ 2012-136196
Dec. 28, 2012  (JP) ................................ 2012-287382

(51) Int. Cl.
*G06F 3/00* (2006.01)
*H04N 5/765* (2006.01)
(Continued)

(52) U.S. Cl.
CPC ......... *G06F 3/005* (2013.01); *H04N 5/23206* (2013.01); *H04N 5/772* (2013.01);
(Continued)

(58) Field of Classification Search
CPC .... G06F 3/005; H04N 5/772; H04N 5/23206; H04N 21/43637; H04N 5/91; H04N 5/765
(Continued)

(56) References Cited

U.S. PATENT DOCUMENTS

2007/0058074 A1*  3/2007  Yamagishi ............. H04N 5/232
                                                        348/372
2007/0073937 A1*  3/2007  Feinberg ................. G06F 9/445
                                                         710/62
(Continued)

FOREIGN PATENT DOCUMENTS

CN       101895683 A     11/2010
CN       101895684 A     11/2010
(Continued)

OTHER PUBLICATIONS

Japanese Office Action dated Oct. 7, 2014, issued in counterpart Japanese Application No. 2012-287382.
(Continued)

*Primary Examiner* — Lin Ye
*Assistant Examiner* — Chan Nguyen
(74) *Attorney, Agent, or Firm* — Holtz, Holtz & Volek PC

(57) ABSTRACT

An image pickup apparatus includes a communication unit, a process unit, a transmission control unit, an obtaining unit and a process control unit. The communication unit is connected to an external device via a predetermined communication line so as to establish communication with the external device. The process unit successively processes images picked up by an image pickup unit. The transmission control unit makes the communication unit send the images to the external device via the communication line. The obtaining unit obtains communication quality information on quality of the communication with the external device. The process control unit controls at least one of (i) an action content of the image pickup unit and (ii) a process content of the process unit on the basis of the communication quality information.

15 Claims, 15 Drawing Sheets

(51) Int. Cl.
  *H04N 5/91* (2006.01)
  *H04N 5/232* (2006.01)
  *H04N 5/77* (2006.01)
  *H04N 21/4363* (2011.01)

(52) U.S. Cl.
  CPC .............. *H04N 5/765* (2013.01); *H04N 5/91* (2013.01); *H04N 21/43637* (2013.01)

(58) Field of Classification Search
  USPC ....................................................... 348/14.12
  See application file for complete search history.

(56) References Cited

U.S. PATENT DOCUMENTS

| | | | | |
|---|---|---|---|---|
| 2008/0057894 | A1* | 3/2008 | Aleksic et al. | 455/187.1 |
| 2010/0020194 | A1* | 1/2010 | Hirooka | 348/229.1 |
| 2011/0279640 | A1* | 11/2011 | Choi | H04N 7/148 348/14.12 |
| 2011/0279685 | A1* | 11/2011 | Alahi | G06K 9/00624 348/187 |
| 2012/0086817 | A1* | 4/2012 | Yamamoto | 348/207.1 |
| 2012/0086834 | A1* | 4/2012 | Adachi | G06T 11/00 348/239 |
| 2013/0077821 | A1* | 3/2013 | Chen | G06T 3/4053 382/103 |
| 2014/0002709 | A1* | 1/2014 | Sakurabu | H04N 5/23293 348/333.09 |

FOREIGN PATENT DOCUMENTS

| | | | |
|---|---|---|---|
| JP | 2001-359108 | * | 6/2000 |
| JP | 2002354149 | A | 12/2002 |
| JP | 2003224588 | A | 8/2003 |
| JP | 2005260641 | A | 9/2005 |
| JP | 2007067626 | A | 3/2007 |
| JP | 2008-079233 | A | 4/2008 |
| JP | 2012070113 | A | 4/2012 |

OTHER PUBLICATIONS

Japanese Office Action Dated Jul. 8, 2014 in counterpart Japanese Application No. 2012-287382.

Chinese Office Action (and English translation thereof) dated Jun. 20, 2016, issued in counterpart Chinese Application No. 201310227549.X.

Chinese Office Action (and English translation thereof) dated Jan. 29, 2016, issued in counterpart Chinese Application No. 201310227549.X.

* cited by examiner

IMAGE PICKUP APPARATUS, PORTABLE TERMINAL, IMAGE PICKUP METHOD AND STORAGE MEDIUM

CROSS REFERENCE TO RELATED APPLICATION

This application is based upon and claims the benefit of priority under 35 USC 119 of Japanese Patent Applications No. 2012-136196 filed on Jun. 15, 2012, and No. 2012-287382 filed on Dec. 28, 2012, the entire disclosure of which, including the descriptions, claims, drawings, and abstracts, is incorporated herein by reference in its entirety.

BACKGROUND OF THE INVENTION

1. Field of the Invention

The present invention relates to an image pickup apparatus, a portable terminal, an image pickup method and a storage medium.

2. Description of the Related Art

Conventionally, there is known a shooting system including a digital camera having a wireless communication function and a remote controller which displays image data sent from the digital camera via a predetermined wireless communication line on a display unit, for example, by Japanese Patent Application Laid-Open Publication No. 2008-79233.

This shooting system sends a live view image picked up by the digital camera to the remote controller, and displays the image on the display unit. Accordingly, a user can check the contents of the live view image, and send a recording instruction to the digital camera at a predetermined timing so as to record the image.

However, in the case of the shooting system disclosed in Japanese Patent Application Laid-Open Publication No. 2008-79233, bad influence is exerted on image pickup depending on the state of wireless communication (wireless connection) between the digital camera and the remote controller.

BRIEF SUMMARY OF THE INVENTION

Hence, objects of the present invention include providing an image pickup apparatus, a portable terminal, an image pickup method and a storage medium, each of which can reduce bad influence on image pickup.

In order to achieve at least one of the objects described above, according to a first aspect of the present invention, there is provided An image pickup apparatus including: a communication unit which is connected to an external device via a predetermined communication line so as to establish communication with the external device; a process unit which successively processes images picked up by an image pickup unit; a transmission control unit which makes the communication unit send the images successively processed by the process unit to the external device via the predetermined communication line; an obtaining unit which obtains communication quality information on quality of the communication with the external device established by the communication unit via the predetermined communication line; and a process control unit which controls at least one of (i) an action content of the image pickup unit and (ii) a process content of the process unit on the basis of the communication quality information obtained by the obtaining unit.

In order to achieve at least one of the objects described above, according to a second aspect of the present invention, there is provided a portable terminal connected to an image pickup apparatus via a predetermined communication line, the portable terminal including: a communication unit which receives images from the image pickup apparatus, the images on which a predetermined process has been performed; an obtaining unit which obtains communication quality information on quality of communication between the portable terminal and the image pickup apparatus established by the communication unit via the predetermined communication line; and a transmission control unit which makes the communication unit send a control instruction to change at least one of (i) an action content of image pickup performed by the image pickup apparatus and (ii) a process content of the process performed on the images picked up by the image pickup apparatus to the image pickup apparatus via the predetermined communication line on the basis of the communication quality information obtained by the obtaining unit.

In order to achieve at least one of the objects described above, according to a third aspect of the present invention, there is provided an image pickup method using an image pickup apparatus including a communication unit which is connected to an external device via a predetermined communication line so as to establish communication with the external device and a process unit which successively processes images picked up by an image pickup unit, the image pickup method including: sending the images successively processed by the process unit to the external device by the communication unit via the predetermined communication line; obtaining communication quality information on quality of the communication with the external device established by the communication unit via the predetermined communication line; and controlling at least one of (i) an action content of the image pickup unit and (ii) a process content of the process unit on the basis of the obtained communication quality information.

In order to achieve at least one of the objects described above, according to a fourth aspect of the present invention, there is provided A storage medium storing a program to allow a computer of an image pickup apparatus including communication unit which is connected to an external device via a predetermined communication line so as to establish communication with the external device and a process unit which successively processes images picked up by an image pickup unit to function as: a transmission control unit which makes the communication unit send the images successively processed by the process unit to the external device via the predetermined communication line; an obtaining unit which obtains communication quality information on quality of the communication with the external device established by the communication unit via the predetermined communication line; and a process control unit which controls at least one of (i) an action content of the image pickup unit and (ii) a process content of the process unit on the basis of the communication quality information obtained by the obtaining unit.

DETAILED DESCRIPTION OF THE PREFERRED EMBODIMENTS

In the following, embodiments of the present invention are described with reference to the drawings, which are given by way of illustration only, and thus are not intended to limit the present invention.

First Embodiment

Figure 1:
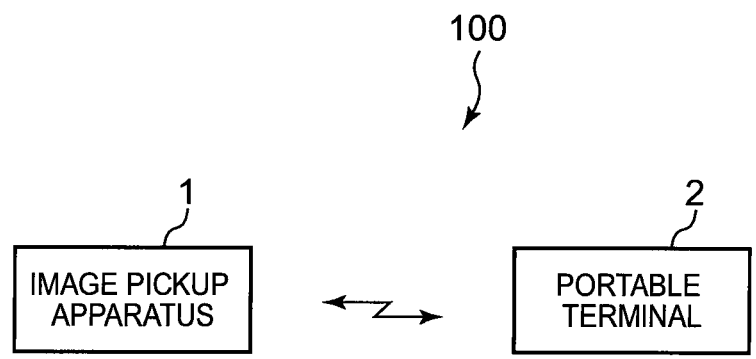
FIG. 1 schematically shows the configuration of an image pickup system of a first embodiment to which the present invention is applied.

FIG. 1 schematically shows the configuration of an image pickup system 100 of a first embodiment to which the present invention is applied.

Figure 2:
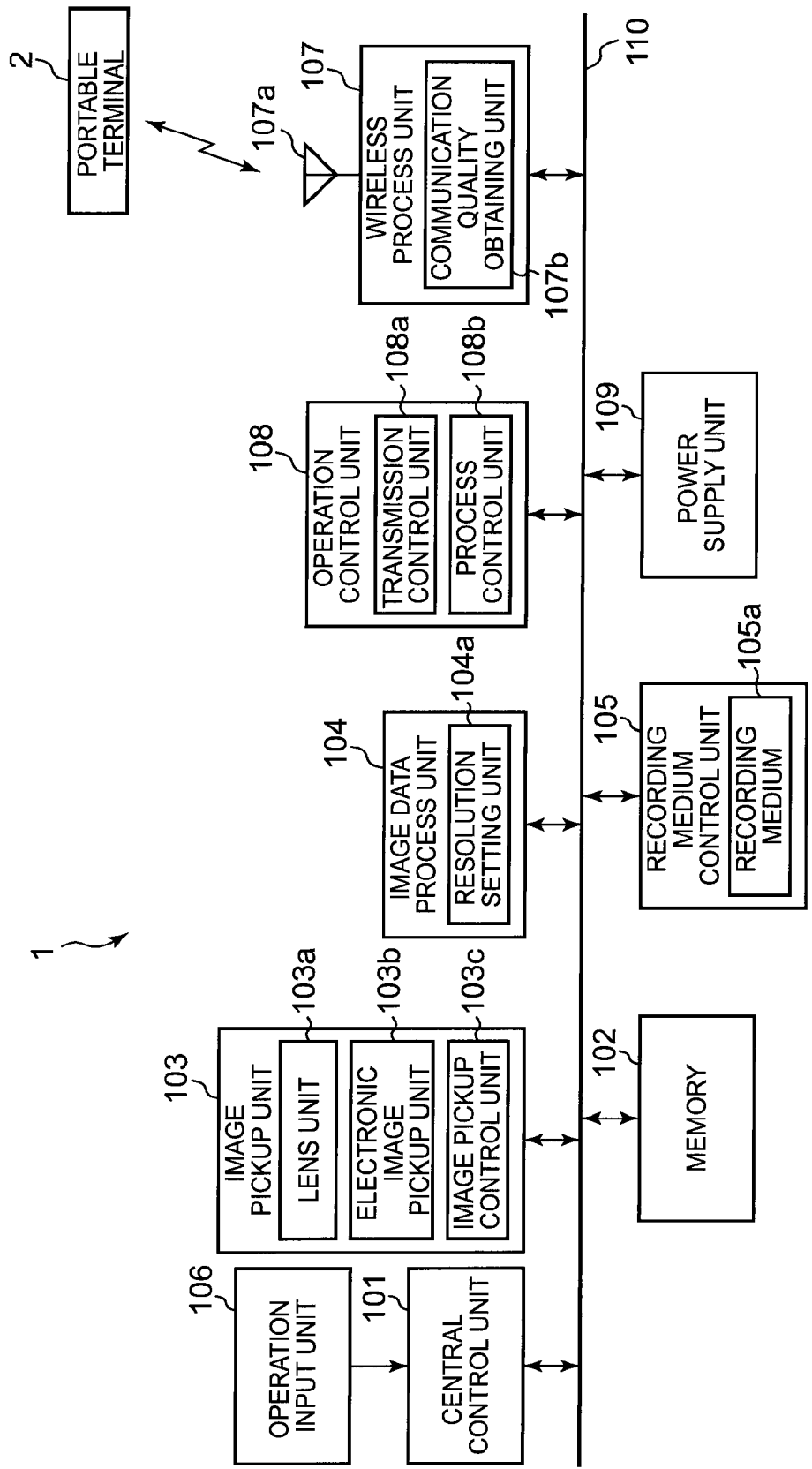
FIG. 2 is a block diagram schematically showing the configuration of an image pickup apparatus which constitutes the image pickup system shown in FIG. 1.
Figure 3:
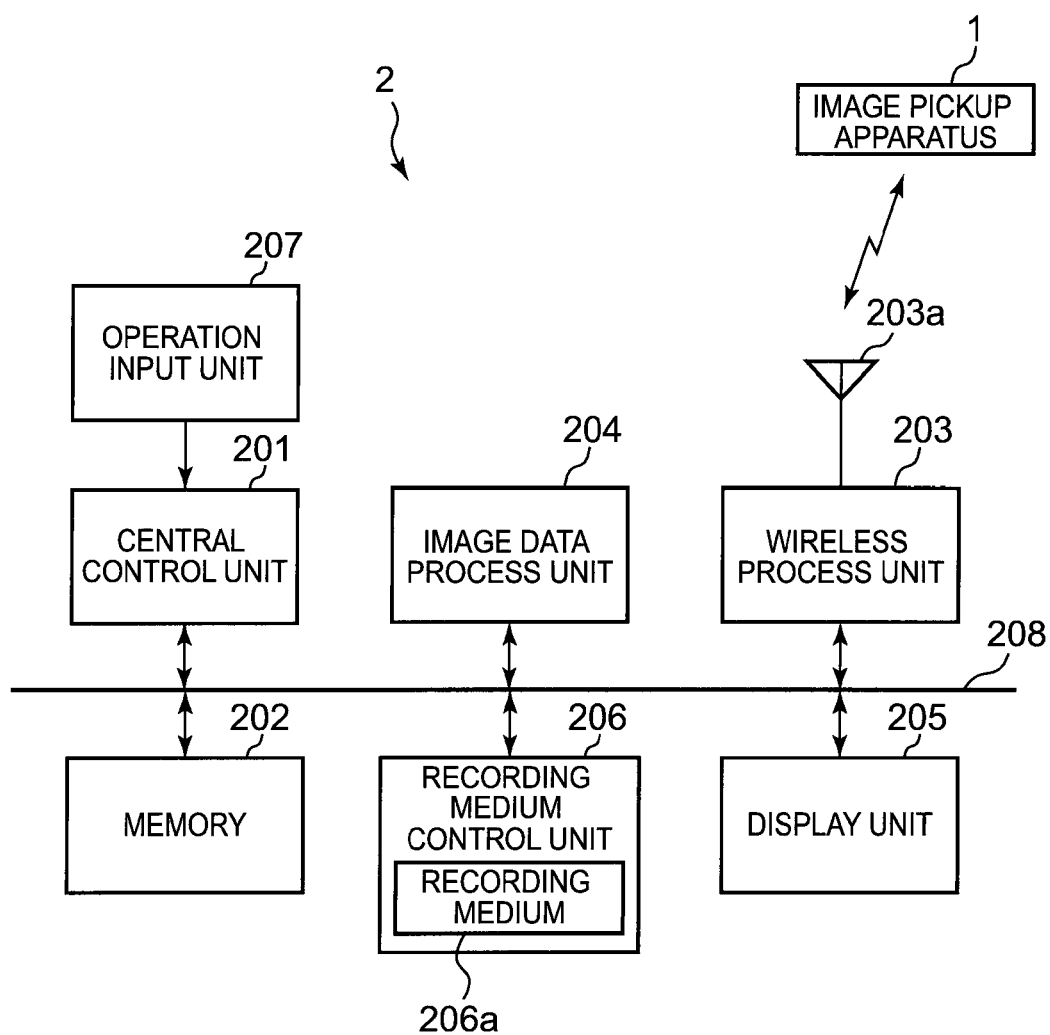
FIG. 3 is a block diagram schematically showing the configuration of a portable terminal which constitutes the image pickup system shown in FIG. 1.

As shown in FIG. 1, the image pickup system 100 of the first embodiment includes an image pickup apparatus 1 (see FIG. 2) and a portable terminal 2 (see FIG. 3). The image pickup apparatus 1 and the portable terminal 2 are connected to each other via a wireless communication line so as to communicate information with each other.

First, the image pickup apparatus 1 is described with reference to FIG. 2.

FIG. 2 is a block diagram schematically showing the configuration of the image pickup apparatus 1, which constitutes the image pickup system 100 of the first embodiment.

As shown in FIG. 2, the image pickup apparatus 1 includes a central control unit 101, a memory 102, an image pickup unit 103, an image data process unit 104, a recording medium control unit 105, an operation input unit 106, a wireless process unit 107, an action control unit 108 and a power supply unit 109.

The central control unit 101, the memory 102, the image pickup unit 103, the image data process unit 104, the recording medium control unit 105, the wireless process unit 107, the action control unit 108 and the power supply unit 109 are connected to each other via a bus line 110.

The central control unit 101 controls the units and the like (components) of the image pickup apparatus 1. More specifically, the central control unit 101 includes a CPU (Central Process Unit), a RAM (Random Access Memory) and a ROM (Read Only Memory) (all not shown), and performs various types of control action in accordance with various process programs (not shown) for the image pickup apparatus 1.

The memory 102 is constituted of, for example, a DRAM (Dynamic Random Access Memory) or the like, and temporarily stores, for example, data processed by the central control unit 101 and other components of the image pickup apparatus 1.

The image pickup unit 103 constitutes an image pickup unit which picks up images of a subject. More specifically, the image pickup unit 103 includes a lens unit 103a, an electronic image pickup unit 103b and an image pickup control unit 103c.

The lens unit 103a is constituted of, for example, a plurality of lenses, such as a zoom lens and a focus lens.

The electronic image pickup unit 103b is constituted of, for example, an image sensor, such as a CCD (Charge Coupled Device) or a CMOS (Complementary Metal-Oxide Semiconductor), and converts optical images having passed through various lenses of the lens unit 103a into two-dimensional image signals.

The image pickup unit 103 may include a stop (not shown) which adjusts the amount of light passing through the lens unit 103a.

The image pickup control unit 103c controls image pickup of a subject performed by the image pickup unit 103. That is, the image pickup control unit 103c includes a timing generator and a driver (both not shown). The image pickup control unit 103c makes the timing generator, the driver and the like scan and drive the electronic image pickup unit 103b so as to make the electronic image pickup unit 103b convert optical images formed by the lens unit 103a into two-dimensional image signals at predetermined intervals, and reads frame images from an image pickup region of the electronic image pickup unit 103b one screen by one screen so as to output the frame images to the image data process unit 104.

The image data process unit 104 generates image data of a subject.

That is, the image data process unit 104, as a process unit, successively processes frame images picked up by the image pickup unit 103. More specifically, the image data process unit 104 appropriately performs gain control on signals having analog values of frame images transferred from the electronic image pickup unit 103b with respect to each color component of RGB, performs sample-holding with a sample hold circuit (not shown), performs conversion into digital data with an analog-to-digital converter, performs a color process including a pixel interpolation process and a gamma correction process with a color process circuit (not shown), and then generates luminance signals Y having digital values and color difference signals Cb and Cr having digital values (YUV data).

The image data process unit 104 includes a resolution setting unit 104a. The resolution setting unit 104a performs resolution setting process to set resolution for YUV data of frame images (output images).

More specifically, the resolution setting unit 104a sets the resolution (for example, a VGA size or a QVGA size) to determine magnification to horizontally and vertically enlarge or reduce YUV data of frame images of a live view image or a video image, for example. The image data process unit 104 generates YUV data of frame images in accordance with the resolution set by the resolution setting unit 104a, and outputs the generated image data having the set resolution to the memory 102.

When an image is recorded, the image data process unit 104 compresses YUV data of a subject in a predetermined encoding format (JPEG, motion JPEG, MPEG or the like), and outputs the compressed data to the recording medium control unit 105.

When an image is reproduced in response to a request from the portable terminal 2, the image data process unit 104 decodes image data of a still image or a video image as a display target read from a recording medium 105a by the recording medium control unit 105 in a corresponding predetermined encoding format, and outputs the decoded image data to the wireless process unit 107 and a communication antenna 107a. The outputted image data is sent to the portable terminal 2 via the communication antenna 107a. It is unnecessary that a portable terminal 2 which sends a RTS (request-to-send) and a portable terminal 2 which is a destination for the image data are the same. The destination for the image data can be specified by an operation to the portable terminal 2 which sends the RTS.

The recording medium 105a is attached to the recording medium control unit 105 in such a way as to be detachable, and the recording medium control unit 105 controls data reading/writing from/on the recording medium 105a.

That is, the recording medium control unit 105 records image data for recording, the image data which is encoded by an encoding unit (not shown) of the image data process unit 104 in a predetermined encoding (compression) format (JPEG, motion JPEG, MPEG or the like) so as to be recorded, in a predetermined recording region of the recording medium 105a.

The recording medium 105a is constituted of, for example, a nonvolatile memory (flash memory) or the like.

The operation input unit 106 is to make predetermined operations for the image pickup apparatus 1, and includes a power button to turn on/off power of the image pickup apparatus 1, a shutter button to pick up images of a subject, a selection/decision button to select an image pickup mode, a function or the like, and a zoom button to adjust a zoom ratio (all not shown). The operation input unit 106 outputs predetermined operation signals to the central control unit 101 in response to the buttons being operated.

The wireless process unit 107 controls communication to send/receive information to/from an external device, such as the portable terminal 2, connected to the image pickup apparatus 1 via a predetermined wireless communication line.

That is, the wireless process unit 107 constitutes a communication unit to establish wireless communication via a predetermined wireless communication line, and includes a wireless LAN module, for example. More specifically, the wireless process unit 107 includes the communication antenna 107a and a communication quality obtaining unit 107b, and acts by Peer to Peer (ad hoc mode) which constructs a wireless communication line between the wireless process unit 107 and a wireless process unit 203 of the portable terminal 2 directly instead of via an external access point (fixed base station), for example. In the ad hoc mode, various pieces of communication control information are preset, such as a communication system of the wireless communication line, encoding information, channels and IP addresses. The wireless process unit 107 establishes wireless communication with the wireless process unit 203 of the portable terminal (external device) 2 which is located within a wireless communication available area, and in which the shared communication control information is set.

The wireless process unit 107 may be built in the recording medium 105a or connected to the image pickup apparatus 1 via a predetermined interface (USB (Universal Serial Bus), for example).

The communication antenna 107a sends/receives signals to/from the external device located within the wireless communication available area via the predetermined wireless communication line, such as wireless LAN (Local Area Network). More specifically, the communication antenna 107a receives beacon packets regularly sent from the wireless process unit 203 of the portable terminal 2 which establishes Wi-Fi (Wireless Fidelity( ) communication.

The beacon packets include identifier signals, such as ESS-ID (Extended Service Set Identifier), ESS-ID (Basic Service Set Identifier) or MAC (Media Access Control) address, and received signal strength, such as RSSI (Received Signal Strength Indication).

The communication quality obtaining unit 107b obtains communication quality information on quality of wireless communication with an external device via a predetermined wireless communication line.

That is, the communication quality obtaining unit 107b, as an obtaining unit, obtains communication quality information on the quality of the wireless communication established between the wireless process unit 107 and the wireless process unit 203 of the portable terminal 2 via the predetermined wireless communication line, such as wireless LAN. The communication quality information includes received signal strength of the beacon packets, which are sent from the wireless process unit 203 of the portable terminal 2 and received by the communication antenna 107a, and the amount of noise generated when the communication antenna 107a receives the beacon packets.

It is considered that because signals are outputted from the wireless process unit 203 of the portable terminal 2 with uniform output strength, the shorter the distance to the wireless process unit 203 is, the higher the received signal strength is, and accordingly, the higher (better) the quality of wireless communication is. In other words, it is considered that the longer the distance to the wireless process unit 203 is, the lower the received signal strength is, and accordingly, the lower (worse) the quality of wireless communication is.

Also, it is considered that the shorter the distance to the wireless process unit 203 is, or the less channel interference is, the less the noise is, and accordingly, the higher (better) the quality of wireless communication is. In other words, it is considered that the longer the distance to the wireless process unit 203 is, or the more channel interference is, the lower the received signal strength is, and accordingly, the lower (worse) the quality of wireless communication is.

The received signal strength and the amount of noise are described as examples of the communication quality information, and hence the communication quality information is not limited thereto, and can be appropriately changed.

A communication network N is constructed, for example, by using a leased line or an existing public line. Various forms of communication lines, such as LAN (Local Area Network) and WAN (Wide Area Network), are applicable to the communication network N. The communication network N includes various communication networks, such as a telephone network, an ISDN network, a dedicated line network, a mobile communication network, a communications satellite network and a CATV network, and Internet service providers which connect the communication networks.

The action control unit 108 includes a transmission control unit 108a and a process control unit 108b.

Each component of the action control unit 108 is constituted of, for example, a predetermined logic circuit. However, this is not a limitation but an example.

The transmission control unit 108a makes the wireless process unit 107 send image data generated by the image data process unit 104 to the portable terminal 2.

That is, the transmission control unit 108a, as a transmission control unit, makes the wireless process unit 107 send image data successively processed by the image data process unit 104 to an external device via a predetermined wireless communication line. More specifically, the transmission control unit 108a controls the wireless process unit 107 so as to make the wireless process unit 107 obtain image data of frame images having predetermined resolution generated by the image data process unit 104 from the memory 102, and send the image data to the portable terminal 2 via a wireless communication line.

The process control unit 108b changes contents of a process performed by the image data process unit 104.

That is, the process control unit 108b, as a process control unit, controls the contents (process contents) of a process performed by the image data process unit 104 on the basis of communication quality information obtained by the communication quality obtaining unit 107b.

More specifically, the process control unit 108b changes the resolution set by the resolution setting process. For example, if the quality of wireless communication related to the communication quality information obtained by the communication quality obtaining unit 107b is relatively good (high), the transmission speed (throughput) which is high enough can be ensured. Hence, the process control unit 108b outputs a signal to the power supply unit 109 to instruct the power supply unit 109 to apply a voltage necessary for a generation process performed by the image data process unit 104 to generate image data having relatively high resolution (for example, image data having a VGA size), and also outputs a signal to the image data process unit 104 to instruct the image data process unit 104 to generate image data having the relatively high resolution.

On the other hand, for example, if the quality of wireless communication related to the communication quality information obtained by the communication quality obtaining unit 107b is relatively bad (low), the transmission speed which is high enough cannot be ensured. Then, reducing data amounts of frame images sent to the portable terminal 2 is required. Hence, the process control unit 108b outputs a signal to the power supply unit 109 to instruct the power supply unit 109 to apply a voltage necessary for the generation process performed by the image data process unit 104 to generate image data having relatively low resolution (lower resolution) (for example, image data having a QVGA size), and also outputs a signal to the image data process unit 104 to instruct the image data process unit 104 to generate image data having the relatively low resolution.

The process performed by the image data process unit 104 requires different amounts of power depending on the contents thereof to be performed. For example, the amount of power required changes depending on the resolution for YUV data of frame images set by the resolution setting process. More specifically, for example, generating image data having relatively high resolution (for example, image data having a VGA size) requires more power than generating image data having relatively low resolution (for example, image data having a QVGA size). That is, while much power can be allotted to the image data process unit 104 when the quality of wireless communication related to the communication quality information is relatively good (high quality), much power cannot be allotted to the image data process unit 104 when the quality of wireless communication related to the communication quality information is relatively bad (low quality). In other words, when the quality of wireless communication related to the communication quality information is relatively bad (low quality), more power than usual is necessary for the wireless process unit 107 to ensure stable wireless communication.

The power supply unit 109 supplies power to the components of the image pickup apparatus 1.

That is, the power supply unit 109 constitutes a power supply unit which supplies power, and includes a rechargeable battery, such as a lithium-ion battery or a nickel-metal hydride battery, for example. That is, the power supply unit 109 has a power supply capacity, which is the maximum power amount to be capable of supplying, is limited to a predetermined amount.

Next, the portable terminal 2 is described with reference to FIG. 3.

FIG. 3 is a block diagram schematically showing the configuration of the portable terminal 2, which constitutes the image pickup system 100 of the first embodiment.

As shown in FIG. 3, the portable terminal 2 includes a central control unit 201, a memory 202, a wireless process unit 203, an image data process unit 204, a display unit 205, a recording medium control unit 206 and an operation input unit 207.

The central control unit 201, the memory 202, the wireless process unit 203, the image data process unit 204, the display unit 205 and the recording medium control unit 206 are connected to each other via a bus line 208.

The central control unit 201 controls the units and the like (components) of the portable terminal 2. More specifically, the central control unit 201 includes a CPU (Central Process Unit), a RAM (Random Access Memory) and a ROM (Read Only Memory) (all not shown), and performs various types of control action in accordance with various process programs (not shown) for the portable terminal 2.

The memory 202 is constituted of, for example, a DRAM (Dynamic Random Access Memory) or the like, and temporarily stores, for example, data processed by the central control unit 201 and other components of the portable terminal 2.

The wireless process unit 203 controls communication to send/receive information to/from an external device, such as the image pickup apparatus 1, connected to the portable terminal 2 via a predetermined wireless communication line.

That is, the wireless process unit 203 constitutes a communication unit to establish wireless communication via a predetermined wireless communication line, and includes a wireless LAN module including a communication antenna 203a, for example. More specifically, as is the case with the wireless process unit 107 of the image pickup apparatus 1, the wireless process unit 203 acts by Peer to Peer (ad hoc mode) which constructs a wireless communication line between the wireless process unit 203 and the wireless process unit 107 of the image pickup apparatus 1 directly instead of via an external access point (fixed base station), for example. In the ad hoc mode, various pieces of communication control information are preset, such as a communication system of the wireless communication line, encoding information, channels, and IP addresses. The wireless process unit 203 establishes wireless communication with the wireless process unit 107 of the image pickup apparatus (external device) 1 which is located within a wireless communication available area, and in which the shared communication control information is set.

For example, the wireless process unit 203 receives, with the communication antenna 203a, image data of frame images sent from the wireless process unit 107 of the image pickup apparatus 1 via a predetermined wireless communication line, and outputs the image data thereof to the image data process unit 204.

The wireless process unit 203 may be built in a recording medium 206a or connected to the portable terminal 2 via a predetermined interface (USB (Universal Serial Bus), for example).

The image data process unit 204 performs various processes (for example, a resolution change process) on the image data of frame images received by the wireless process unit 203, and outputs the image data to the display unit 205. The image data process unit 204 may enlarge or reduce the image data received by the wireless process unit 203 to a predetermined size on the basis of display resolution of a display panel 205a or the like, and output the image data to a display control unit 205b.

When an image is recorded, the image data process unit 204 compresses image data in a predetermined encoding format (JPEG, motion JPEG, MPEG or the like), and outputs the compressed image data to the recording medium control unit 206.

The display unit 205 includes, for example, an LCD, and displays various pieces of information on a display screen thereof under the control of the CPU of the central control unit 201.

More specifically, the display unit 205 displays, on the basis of the image data of the frame images sent from the image pickup apparatus 1 and received by the wireless process unit 203, a corresponding live view image, video image or the like on the display screen. Also, in a reproduction mode, an image recorded in the recording medium 105a is transferred to the portable terminal 2 so that the display unit 205 displays the image on the display screen.

The recording medium 206a is attached to the recording medium control unit 206 in such a way as to be detachable, and the recording medium control unit 206 controls data reading/writing from/on the recording medium 206a.

That is, the recording medium control unit 206 records image data having predetermined resolution received by the wireless process unit 203 in a predetermined recording region of the recording medium 206a on the basis of a recording instruction to record an image corresponding to a predetermined operation made by a user with the operation input unit 207.

The recording medium 206a is constituted of, for example, a nonvolatile memory (flash memory) or the like.

The operation input unit 207 is to make predetermined operations for the portable terminal 2, and includes a power button to turn on/off power of the portable terminal 2, a shutter button to pick up images of a subject, a selection/decision button to select an image pickup mode, a function or the like, and a zoom button to adjust a zoom ratio (all not shown). The operation input unit 207 outputs predetermined operation signals to the central control unit 201 in response to the buttons being operated.

Next, an image transmission process performed by the image pickup system 100 of the first embodiment is described with reference to FIGS. 4 to 6.

Figure 4:
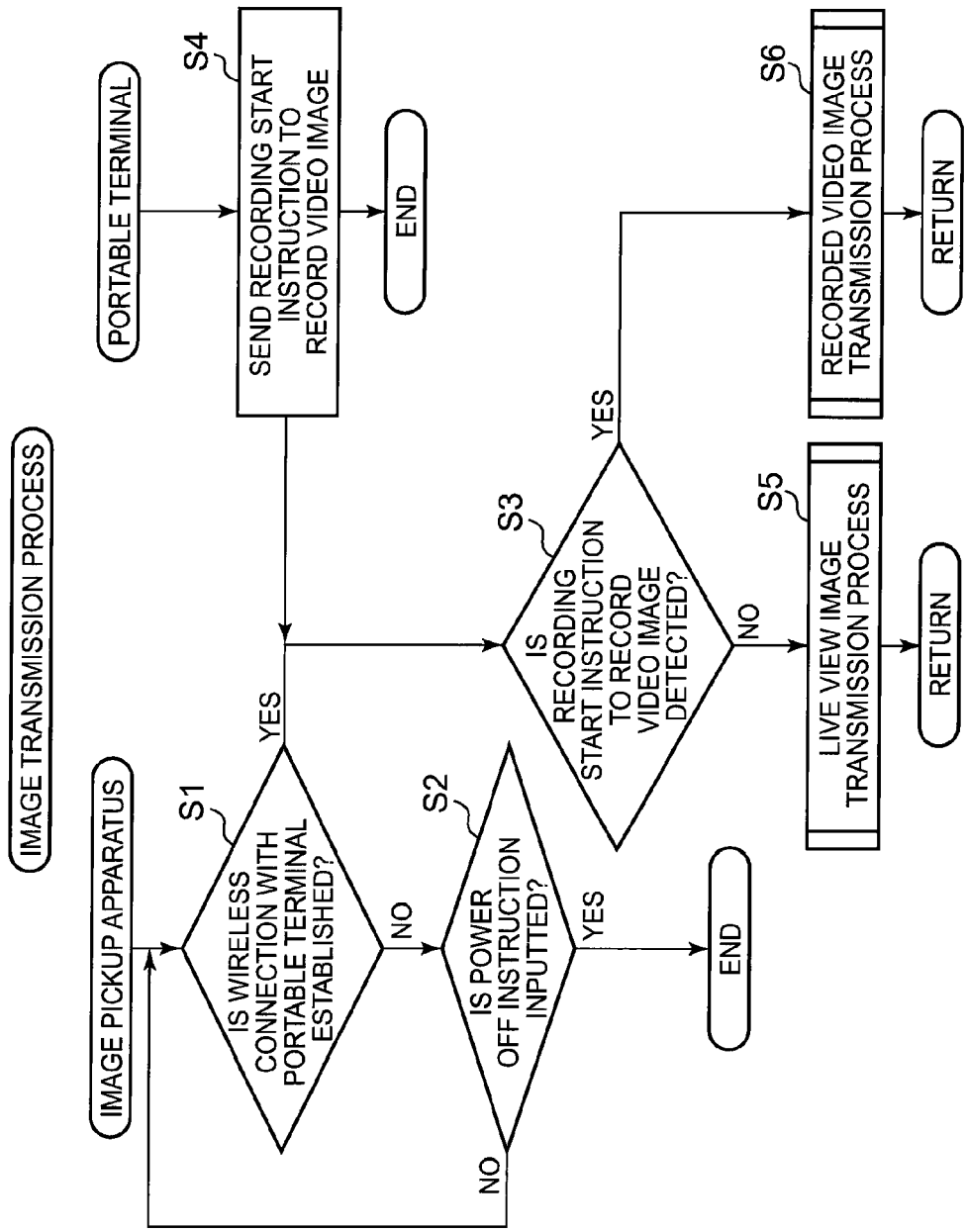
FIG. 4 is a flowchart showing an example of action of an image transmission process performed by the image pickup system shown in FIG. 1.

FIG. 4 is a flowchart showing an example of action of the image transmission process performed by the image pickup system 100.

Although the image transmission process described below is performed by the image pickup apparatus 1 and the portable terminal 2 working in cooperation with each other, the process performed by the image pickup apparatus 1 is mainly described below. Preferably, the image pickup apparatus 1 is disposed at a predetermined position and the components of the image pickup unit 103 thereof are adjusted in such a way as to obtain user's desired composition and angle of view.

[Image Transmission Process]

As shown in FIG. 4, in the image pickup apparatus 1, the CPU of the central control unit 101 determines whether or not the image pickup apparatus 1 is connected to the portable terminal 2 by the wireless process unit 107 via a predetermined wireless communication line (for example, wireless LAN) to establish wireless communication (Step S1). That is, the CPU of the central control unit 101 determines whether or not the wireless process unit 107 is connected to the wireless process unit 203 of the portable terminal 2 via a predetermined wireless communication line so as to communicate information with each other.

When determining that the image pickup apparatus 1 is not connected to the portable terminal 2 to establish wireless communication (Step S1; NO), the CPU of the central control unit 101 determines whether or not a power OFF instruction corresponding to an OFF operation made by a user with the power button of the operation input unit 106 is inputted (Step S2).

When determining that the power OFF instruction is not inputted (Step S2; NO), the CPU of the central control unit 101 returns to Step S1, and repeats Step S1 at predetermined intervals (Step S1).

On the other hand, when determining that the image pickup apparatus 1 is connected to the portable terminal 2 to establish wireless communication (Step S1; YES), the CPU of the central control unit 101 determines whether or not a recording start instruction to record a video image is detected (Step S3). That is, the CPU of the central control unit 101 determines whether or not a recording start instruction to record a video image is detected (Step S3) on the basis of determination whether or not the recording start instruction corresponding to a predetermined operation made by a user with the shutter button of the operation input unit 207 of the portable terminal 2 is sent from the wireless process unit 203 (Step S4), and the wireless process unit 107 receives the recording start instruction via the predetermined wireless communication line.

When determining that the recording start instruction is not detected (Step S3; NO), the CPU of the central control unit 101 controls execution of a live view image transmission process (see FIG. 5) (Step S5). On the other hand, when determining that the recording start instruction is detected (Step S3; YES), the CPU of the central control unit 101 controls execution of a recorded video image transmission process (see FIG. 6) (Step S6).

[Live View Image Transmission Process]

In the following, the live view image transmission process is described with reference to FIG. 5.

Figure 5:
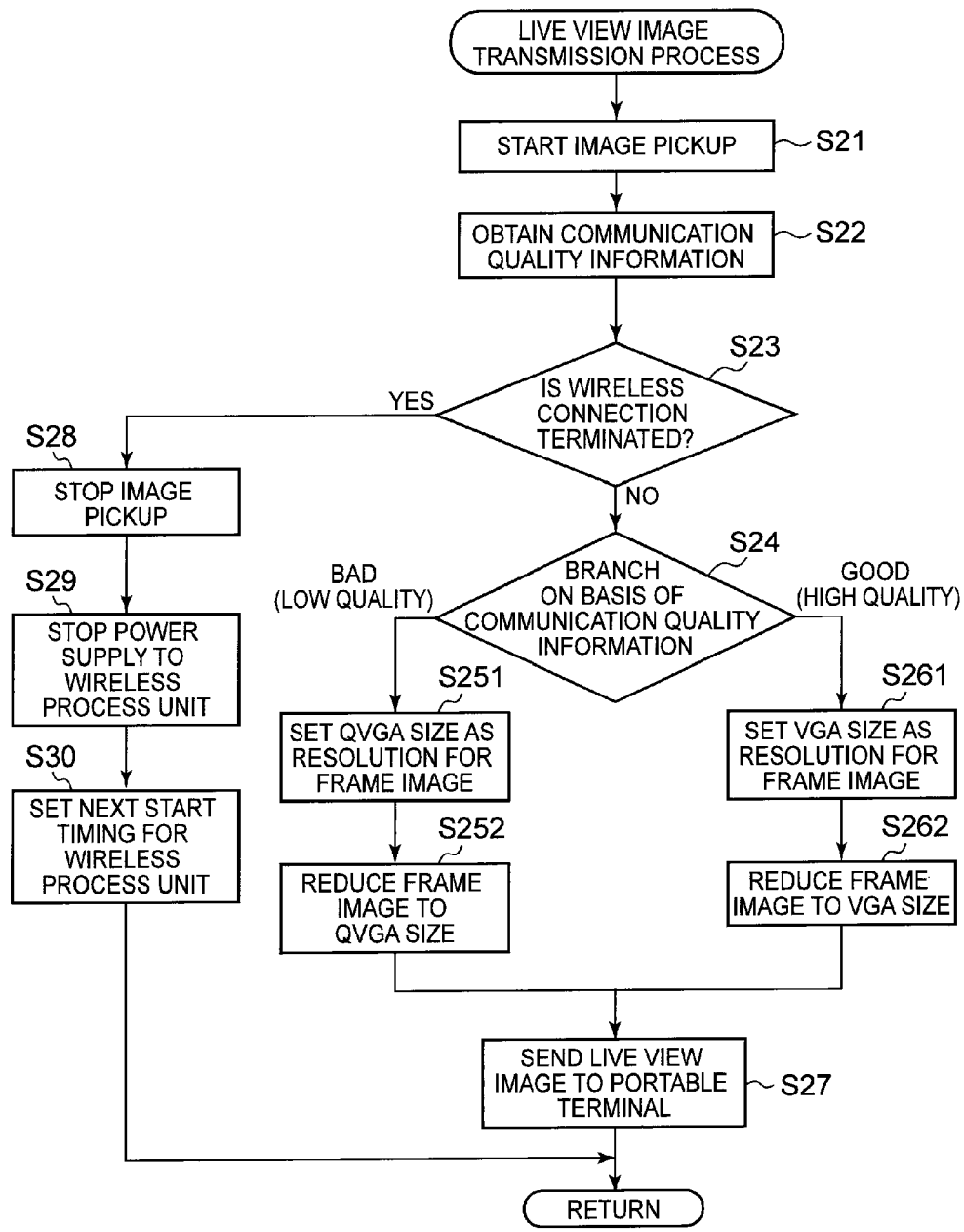
FIG. 5 is a flowchart showing an example of action of a live view image transmission process in the image transmission process shown in FIG. 4.

FIG. 5 is a flowchart showing an example of action of the live view image transmission process in the image transmission process.

As shown in FIG. 5, first, the image pickup unit 103 starts picking up an image for live viewing (a live view image) (Step S21). That is, the image pickup control unit 103*c* reads two-dimensional image signals into which optical images formed by the lens unit 103*a* are converted by the electronic image pickup unit 103*b* from the image pickup region of the electronic image pickup unit 103*b* at a predetermined image pickup frame rate one screen by one screen so as to generate frame images of a live view image.

Next, the communication quality obtaining unit 107*b* obtains communication quality information on the wireless communication established between the wireless process unit 107 and the wireless process unit 203 of the portable terminal 2 via the predetermined wireless communication line (Step S22). More specifically, the communication quality obtaining unit 107*b* obtains the received signal strength of beacon packets and/or the amount of noise generated when the beacon packets are received as the communication quality information.

Next, the CPU of the central control unit 101 determines whether or not the wireless connection (wireless communication) with the portable terminal 2 established by the wireless process unit 107 via the predetermined wireless communication line is terminated on the basis of the communication quality information obtained by the communication quality obtaining unit 107*b* (Step S23).

When determining that the wireless connection with the portable terminal 2 is not terminated (Step S23; NO), the CPU of the central control unit 101 makes the process branch on the basis of the communication quality information obtained by the communication quality obtaining unit 107*b* (Step S24). More specifically, the CPU of the central control unit 101 proceeds to Step S251 when the quality of the wireless communication related to the communication quality information is relatively bad (low quality) (Step S24; Bad), and proceeds to Step S261 when the quality of the wireless communication related to the communication quality information is relatively good (high quality) (Step S24; Good).

[Quality of Wireless Communication; Bad]

When the quality of the wireless communication is relatively bad (Step S24; Bad), the transmission speed high enough cannot be ensured (for example, the transmission speed being less than about 10 Mbps), which requires reducing the data amounts of frame images sent to the portable terminal 2, so that the process control unit 108*b* makes the resolution setting unit 104*a* of the image data process unit 104 set the QVGA size as the resolution for YUV data of the frame images (Step S251). In addition, the process control unit 108*b* outputs a signal to the power supply unit 109 to instruct the power supply unit 109 to apply a voltage necessary for the generation process performed by the image data process unit 104 to generate image data having the relatively low resolution (lower resolution) set by the resolution setting unit 104*a*.

Then, the image data process unit 104 reduces the YUV data of the frame images of the live view image horizontally and vertically in accordance with the resolution (QVGA size) set by the resolution setting unit 104*a* so as to generate YUV data having the QVGA size, and outputs the generated image data to the memory 102 (Step S252).

[Quality of Wireless Communication; Good]

When the quality of the wireless communication is relatively good (Step S24; Good), the transmission speed high enough can be ensured (for example, the transmission speed being about 10 Mbps or more), so that the process control unit 108*b* makes the resolution setting unit 104*a* of the image data process unit 104 set the VGA size as the resolution for YUV data of the frame images (Step S261). In addition, the process control unit 108*b* outputs a signal to the power supply unit 109 to instruct the power supply unit 109 to apply a voltage necessary for the generation process performed by the image data process unit 104 to generate image data having the relatively high resolution set by the resolution setting unit 104*a*.

Then, the image data process unit 104 reduces the YUV data of the frame images of the live view image horizontally and vertically in accordance with the resolution (VGA size) set by the resolution setting unit 104*a* so as to generate YUV data having the VGA size, and outputs the generated image data to the memory 102 (Step S262).

After that, the transmission control unit 108*a* controls the wireless process unit 107 in such a way that the wireless process unit 107 obtains the YUV data of the frame images having the set resolution of the live view image, the YUV data being generated by the image data process unit 104, from the memory 102, and sends the YUV data to the portable terminal 2 via the predetermined wireless communication line (Step S27).

On the other hand, when determining that the wireless connection (wireless communication) with the portable terminal 2 is terminated (Step S23; YES), the CPU of the central control unit 101 makes the image pickup unit 103 stop image pickup (Step S28), and then makes the power supply unit 109 stop power supply to the wireless process unit 107 (Step S29).

After that, the CPU of the central control unit 101 controls a not-shown timer unit so that a next start timing for the wireless process unit 107, namely, a timing to search for an external device (for example, in three minutes from a current time), is set (Step S30).

The live view image transmission process is repeated until an end instruction to end the live view image transmission process or a start instruction to start another process (for example, the recorded video image transmission process) is inputted.

[Recorded Video Image Transmission Process]

In the following, the recorded video image transmission process is described with reference to FIG. 6.

Figure 6:
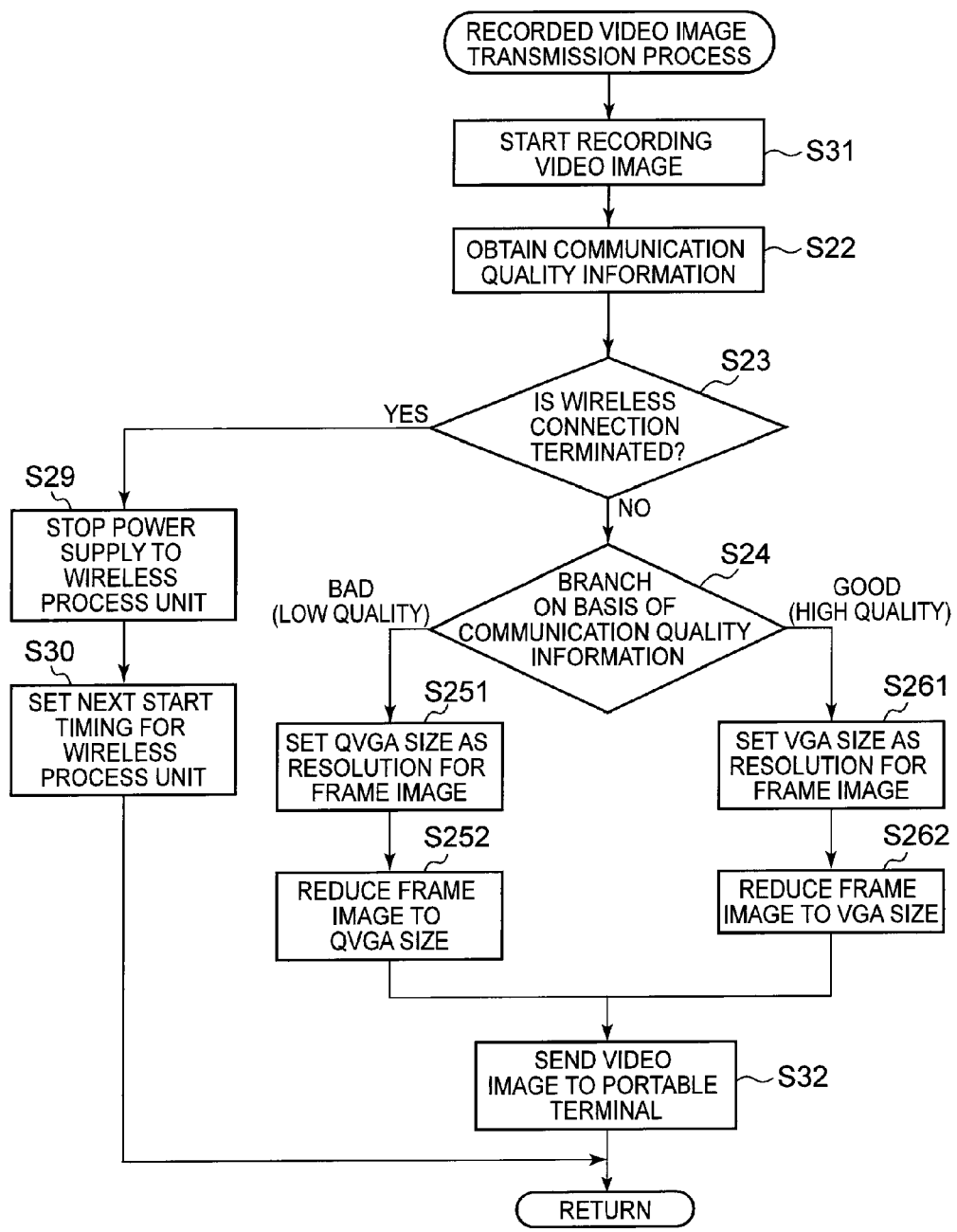
FIG. 6 is a flowchart showing an example of action of a recorded video image transmission process in the image transmission process shown in FIG. 4.

FIG. 6 is a flowchart showing an example of action of the recorded video image transmission process in the image transmission process.

The recorded video image transmission process described below is similar to the live view image transmission process described above except for points described in detail below. Hence, with respect to the similar points, the detailed description is omitted.

As shown in FIG. 6, first, the image pickup unit 103 starts recording a video image (Step S31). That is, the image pickup control unit 103*c* reads two-dimensional image signals into which optical images formed by the lens unit 103*a* are converted by the electronic image pickup unit 103*b* from the image pickup region of the electronic image pickup unit 103*b* at a predetermined image pickup frame rate one screen by one screen so as to generate frame images of a video view image. Further, the image data process unit 104 generates image data for recording in motion JPEG from the frame images transferred from the electronic image pickup unit 103*b*, and the recording medium control unit 105 records the generated image data for recording in the recording medium 105*a*.

The image data of the video image picked up by the image pickup apparatus 1 may be recorded in the recording medium 206*a* of the portable terminal 2 connected to the image pickup apparatus 1 via the predetermined wireless communication line.

Next, as is the case with the live view image transmission process, the communication quality obtaining unit 107*b* obtains communication quality information on the wireless communication established between the wireless process unit 107 and the wireless process unit 203 of the portable terminal 2via the predetermined wireless communication line (Step S22).

Next, as is the case with the live view image transmission process, the CPU of the central control unit 101 determines whether or not the wireless connection (wireless communication) with the portable terminal 2 established by the wireless process unit 107 via the predetermined wireless communication line is terminated on the basis of the communication quality information obtained by the communication quality obtaining unit 107*b* (Step S23).

When determining that the wireless connection with the portable terminal 2 is not terminated (Step S23; NO), as is the case with the live view image transmission process, the CPU of the central control unit 101 makes the process branch on the basis of the communication quality information obtained by the communication quality obtaining unit 107*b* (Step S24).

[Quality of Wireless Communication; Bad]

When the quality of the wireless communication is relatively bad (Step S24; Bad), as is the case with the live view image transmission process, the process control unit 108*b* makes the resolution setting unit 104*a* of the image data process unit 104 set the QVGA size as the resolution for YUV data of the frame images (Step S251). In addition, the process control unit 108*b* outputs a signal to the power supply unit 109 to instruct the power supply unit 109 to apply a voltage necessary for the generation process performed by the image data process unit 104 to generate image data having the relatively low resolution.

Then, the image data process unit 104 reduces the YUV data of the frame images of the video image horizontally and vertically in accordance with the resolution (QVGA size) set by the resolution setting unit 104*a* so as to generate YUV data having the QVGA size, and outputs the generated image data to the memory 102 (Step S252).

[Quality of Wireless Communication; Good]

When the quality of the wireless communication is relatively good (Step S24; Good), as is the case with the live view image transmission process, the process control unit 108*b* makes the resolution setting unit 104*a* of the image data process unit 104 set the VGA size as the resolution for YUV data of the frame images (Step S261). In addition, the process control unit 108*b* outputs a signal to the power supply unit 109 to instruct the power supply unit 109 to apply a voltage necessary for the generation process performed by the image data process unit 104 to generate image data having the relatively high resolution.

Then, the image data process unit 104 reduces the YUV data of the frame images of the video image horizontally and vertically in accordance with the resolution (VGA size) set by the resolution setting unit 104*a* so as to generate YUV data having the VGA size, and outputs the generated image data to the memory 102 (Step S262).

After that, the transmission control unit 108*a* controls the wireless process unit 107 in such a way that the wireless process unit 107 obtains the YUV data of the frame images having the set resolution of the video image, the YUV data being generated by the image data process unit 104, from the memory 102, and sends the YUV data to the portable terminal 2 via the predetermined wireless communication line (Step S32).

On the other hand, when determining that the wireless connection (wireless communication) with the portable terminal 2 is terminated (Step S23; YES), as is the case with the live view image transmission process, the CPU of the central control unit 101 makes the power supply unit 109 stop power supply to the wireless process unit 107 (Step S29). That is, power supply to the recording medium control unit 105 is not stopped, so that recording of the image data of the video image continues.

After that, as is the case with the live view image transmission process, the CPU of the central control unit 101 controls a not-shown timer unit so that a next start timing for the wireless process unit 107, namely, a timing to search for an external device (for example, in three minutes from a current time), is set (Step S30).

The recorded video image transmission process is repeated until an end instruction to end the recorded video image transmission process or a start instruction to start another process (for example, the live view image transmission process) is inputted.

As described above, according to the image pickup system 100 of the first embodiment, in the image transmission process to send images successively processed by the image data process unit 104 to an external device by the wireless process unit 107, the image pickup apparatus 1 obtains the communication quality information on the quality of wireless communication with the external device established by the wireless process unit 107 via a predetermined wireless communication line, and controls the contents of the process performed by the image data process unit 104 on the basis of the communication quality information. Accordingly, the contents of the process performed by the image data process unit 104 can be changed with the quality of the communication taken into account. That is, because the transmission speed (throughput) changes depending on the quality of the wireless communication, for example, if the quality of the wireless communication is relatively bad, the contents of the process performed by the image data process unit 104 are changed in such a way that the data amounts of the frame images sent to the portable terminal 2 are less compared with the case where the quality of the wireless communication is relatively good. Accordingly, bad influence on image pickup can be reduced.

More specifically, changing the resolution for output images (output image resolution) on the basis of the communication quality information, the resolution being set by the resolution setting process, can increase or reduce the data amounts of the frame images sent to the portable terminal 2, and reduce bad influence of the frame images on the wireless communication. Even if the resolution for the frame images sent to the portable terminal 2 is low, a user can know a state of an image (a live view image or the like) being picked up to some extent, so that bad influence on image pickup can be reduced.

Furthermore, in the first embodiment, the contents of the process performed by the image data process unit 104 are controlled according to the amount of power necessary to make the wireless communication stable. When the quality of the wireless communication is relatively bad, more power is required to ensure stable wireless communication by the wireless process unit 107 compared with the time when the quality of the wireless communication is relatively good, and hence, much power cannot be allotted to the image data process unit 104. Then, the contents of the process performed by the image data process unit 104 are changed in such a way that the process requires less power. Accordingly, bad influence on image pickup and wireless communication can be reduced.

In the first embodiment, the image data process unit 104 sets the resolution for YUV data of frame images. However, the image pickup control unit 103c may change the resolution for YUV data of frame images by reading the frame images only from a predetermined region (for example, a central region) of the image pickup region of the electronic image pickup unit 103b.

Second Embodiment

In the following, an image pickup system of a second embodiment is described.

An image pickup apparatus 301 which constitutes the image pickup system of the second embodiment is similar to the image pickup apparatus 1 of the first embodiment except for points described below. Hence, with respect to similar points, detailed description is omitted.

Figure 7:
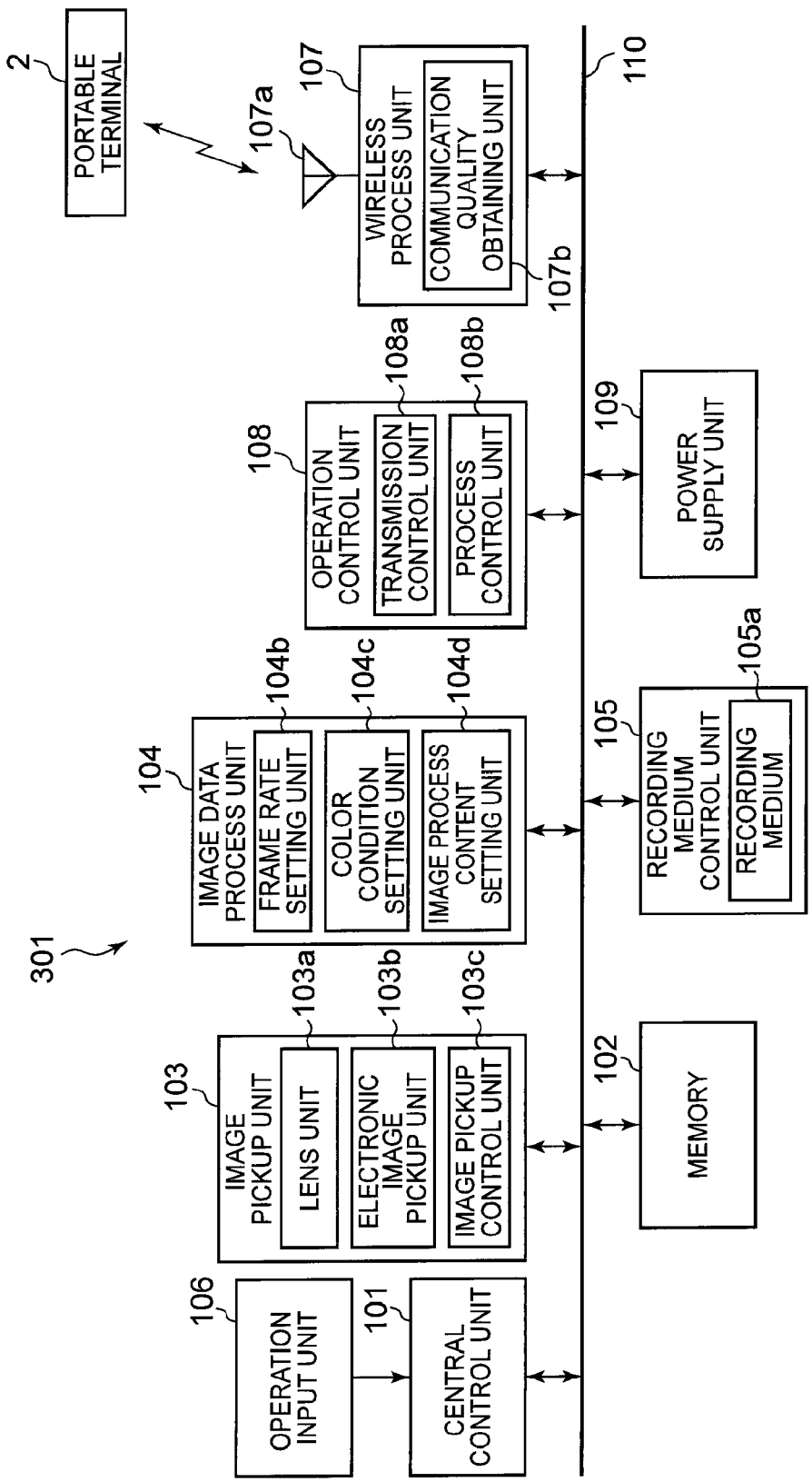
FIG. 7 is a block diagram schematically showing the configuration of an image pickup apparatus which constitutes an image pickup system of a second embodiment to which the present invention is applied.

FIG. 7 is a block diagram schematically showing the configuration of the image pickup apparatus 301, which constitutes the image pickup system of the second embodiment to which the present invention is applied.

As shown in FIG. 7, the image data process unit 104 of the image pickup apparatus 301 of the second embodiment includes a frame rate setting unit 104b, a color condition setting unit 104c and an image process content setting unit 104d.

The frame rate setting unit 104b performs a frame rate setting process to set a frame rate to process frame images picked up by the image pickup unit 103.

More specifically, the frame rate setting unit 104b sets, for example, a relatively high frame rate or a relatively low frame rate as timings (intervals) to process YUV data of frame images of a live view image or a video image, the frame images being successively transferred from the image pickup unit 103. The image data process unit 104 generates YUV data of the frame images at predetermined timings (intervals) in accordance with the frame rate set by the frame rate setting unit 104b, and outputs the generated image data to the memory 102.

The frame rate set by the frame rate setting process corresponds to a frame rate at which the frame images are transferred (sent) to the portable terminal 2 via a wireless communication line. The image pickup frame rate to determine timings (intervals) to read frame images from the image pickup region of the electric image pickup unit 103b is high enough with respect to the frame rate set by the frame rate setting process.

The color condition setting unit 104c performs a color condition setting process to set a condition related to colors (color condition) of frame images picked up by the image pickup unit 103.

More specifically, the color condition setting unit 104c sets, for example, a color condition used for an image process performed on YUV data of frame images of a live view image or a video image, the frame images being successively transferred from the image pickup unit 103. For example, the color condition setting unit 104c determines generating monochrome images by performing a binarization process so as to reduce the number of colors (color number) of frame images, and/or determines a content (for example, a compression rate of color difference signals) of a process related to colors in a predetermined encoding format (for example, JPEG) so as to reduce the amount of color information on frame images. The image data process unit 104 generates YUV data of frame images in accordance with the color condition set by the color condition setting unit 104c, and outputs the generated image data to the memory 102.

The image process content setting unit 104d performs an image process content setting process to set a content of the image process performed on frame images picked up by the image pickup unit 103.

That is, the image data process unit 104 performs various types (for example, edge extraction) of the image process on YUV data of frame images of a live view image or a video image, the frame images being successively transferred from the image pickup unit 103c, so as to generate image data, the data amounts of which are reduced. At the time, the image process content setting unit 104d sets a content of the image process performed on the YUV data of the frame images, for example, so as to change the data amounts of the frame images.

The image data process unit 104 generates YUV data of frame images on which the image process has been performed (for example, contour images after edge extraction) in accordance with the content set by the image process content setting unit 104d, and outputs the generated image data to the memory 102.

Then, the process control unit 108b of the action control unit 108 changes the frame rate set by the frame rate setting process performed by the frame rate setting unit 104b of the image data process unit 104 on the basis of the communication quality information obtained by the communication quality obtaining unit 107b.

That is, if the quality of wireless communication related to the communication quality information obtained by the communication quality obtaining unit 107b is relatively good, the transmission speed (throughput) high enough can be ensured. Hence, the process control unit 108b outputs a signal to the power supply unit 109 to instruct the power supply unit 109 to apply a voltage necessary for the generation process performed by the image data process unit 104 to generate image data at a relatively high frame rate (for example, 30 fps), and also outputs a signal to the image data process unit 104 to instruct the image data process unit 104 to generate image data at the relatively high frame rate.

On the other hand, if the quality of wireless communication related to the communication quality information obtained by the communication quality obtaining unit 107b is relatively bad, the transmission speed (throughput) high enough cannot be ensured, which requires reducing the data amounts of frame images sent to the portable terminal 2. Hence, the process control unit 108b outputs a signal to the power supply unit 109 to instruct the power supply unit 109 to apply a voltage necessary for the generation process performed by the image data process unit 104 to generate image data at a relatively low frame rate (lower frame rate) (for example, 15 fps), and also outputs a signal to the image data process unit 104 to instruct the image data process unit 104 to generate image data at the relatively low frame rate.

The process control unit 108b changes the color condition set by the color condition setting process performed by the color condition setting unit 104c of the image data process unit 104 on the basis of the communication quality information obtained by the communication quality obtaining unit 107b.

That is, if the quality of wireless communication related to the communication quality information obtained by the communication quality obtaining unit 107b is relatively good, the transmission speed high enough can be ensured. Hence, the process control unit 108b outputs a signal to the power supply unit 109 to instruct the power supply unit 109 to apply a voltage necessary for the generation process performed by the image data process unit 104 to generate image data of images each having a relatively large number of colors (for example, color images), namely, a relatively high color number, and also outputs a signal to the image data process unit 104 to instruct the image data process unit 104 to generate image data of images each having the relatively large number of colors.

On the other hand; if the quality of wireless communication related to the communication quality information obtained by the communication quality obtaining unit 107b is relatively bad, the transmission speed high enough cannot be ensured, which requires reducing the data amounts of frame images sent to the portable terminal 2. Hence, the process control unit 108b outputs a signal to the power supply unit 109 to instruct the power supply unit 109 to apply a voltage necessary for the generation process performed by the image data process unit 104 to generate image data of images each having a relatively small number of colors (smaller number of colors) (for example, monochrome images), namely, a relatively low color number, and also outputs a signal to the image data process unit 104 to instruct the image data process unit 104 to generate image data of images each having the relatively small number of colors.

The process control unit 108b changes the content of the image process set by the image process content setting process performed by the image process content setting unit 104d of the image data process unit 104 to another on the basis of the communication quality information obtained by the communication quality obtaining unit 107.

That is, if the quality of wireless communication related to the communication quality information obtained by the communication quality obtaining unit 107b is relatively good, the transmission speed high enough can be ensured. Hence, the process control unit 108b outputs a signal to the power supply unit 109 to instruct the power supply unit 109 to apply a voltage necessary for the generation process performed by the image data process unit 104 to generate image data of images each having a relatively large data amount (for example, color images), and also outputs a signal to the image data process unit 104 to instruct the image data process unit 104 to generate image data of images each having the relatively large data amount.

On the other hand, if the quality of wireless communication related to the communication quality information obtained by the communication quality obtaining unit 107b is relatively bad, the transmission speed high enough cannot be ensured, which requires reducing the data amounts of frame images sent to the portable terminal 2. Hence, the process control unit 108b outputs a signal to the power supply unit 109 to instruct the power supply unit 109 to apply a voltage necessary for the generation process performed by the image data process unit 104 to generate image data of images each having a relatively small data amount (smaller data amount) (for example, contour images), and also outputs a signal to the image data process unit 104 to instruct the image data process unit 104 to generate image data of images each having the relatively small data amount.

The frame rate setting process, the color condition setting process and the image process content setting process require different amounts of power depending on the content of each process to be performed, as is the case with the first embodiment.

That is, for example, generating image data at a relatively high frame rate (for example, 30 fps) requires more power than generating image data at a relatively low frame rate (for example, 15 fps). Also, generating image data of images each having a relatively large number of colors (for example, color images) requires more power than generating image data of images each having a relatively small number of colors (for example, monochrome images). Also, generating image data of images each having a relatively large data amount (for example, color images) requires more power than generating image data of images each having a relatively small data amount (for example, contour images).

Next, an image transmission process performed by the image pickup system of the second embodiment is described with reference to FIGS. 4, 8 and 9.

The image transmission process performed by the image pickup system of the second embodiment is similar to the image transmission process performed by the image pickup system 100 of the first embodiment except for points described below. Hence, with respect to the similar points, detailed description is omitted. In the second embodiment, the frame rate used when the image data process unit 104 processes frame images changes depending on the communication quality.

That is, as is the case with the image transmission process of the first embodiment, in the image pickup system of the second embodiment, when determining that a recording start instruction to record a video image is detected (Step S3; NO), the CPU of the central control unit 101 controls execution of the live view image transmission process (see FIG. 8) (Step S5). On the other hand, when determining that the recording start instruction is detected (Step S3; YES), the CPU of the central control unit 101 controls execution of the recorded video image transmission process (see FIG. 6) (Step S6).

[Live View Image Transmission Process]

In the following, the live view image transmission process is described with reference to FIG. 8.

Figure 8:
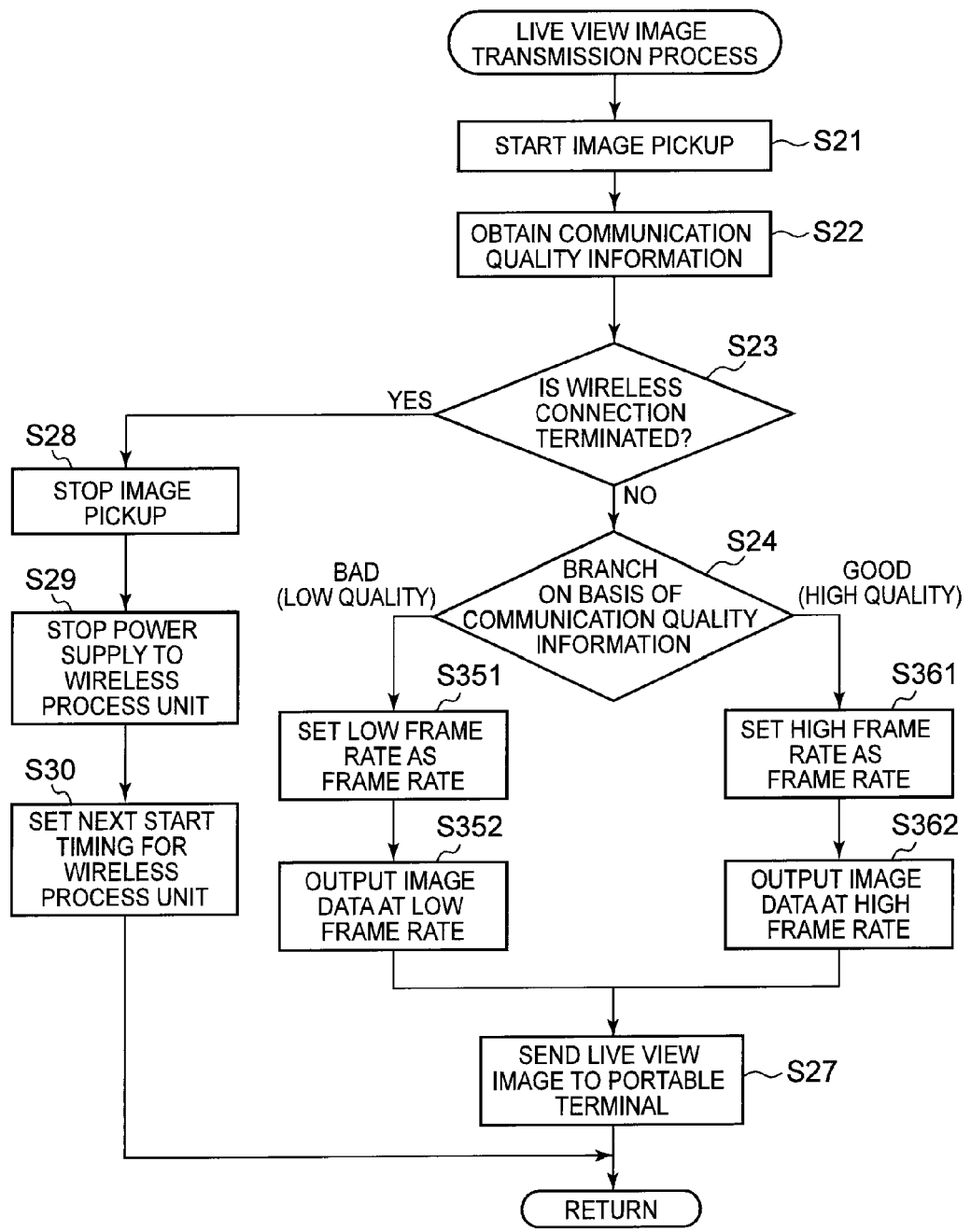
FIG. 8 is a flowchart showing an example of action of a live view image transmission process in an image transmission process performed by the image pickup system of the second embodiment.

FIG. 8 is a flowchart showing an example of action of the live view image transmission process.

The live view image transmission process described below is similar to the live view image transmission process performed by the image pickup system 100 of the first embodiment except for points described below. Hence, with respect to the similar points, detailed description is omitted.

As shown in FIG. 8, as is the case with the live view image transmission process of the first embodiment, Steps S21 to S23 are taken, and at Step S24, the CPU of the central control unit 101 makes the process branch on the basis of the communication quality information obtained by the communication quality obtaining unit 107b (Step S24).

[Quality of Wireless Communication; Bad]

When the quality of the wireless communication is relatively bad (Step S24; Bad), the transmission speed high enough cannot be ensured (for example, the transmission speed being less than about 10 Mbps), which requires reducing the data amounts of frame images sent to the portable terminal 2, so that the process control unit 108b makes the frame rate setting unit 104b of the image data process unit 104 set a relatively low frame rate (lower frame rate) (for example, 15 fps) as the timings (intervals) to process YUV data of the frame images (Step S351). In addition, the process control unit 108b outputs a signal to the power supply unit 109 to instruct the power supply unit 109 to apply a voltage necessary for the generation process performed by the image data process unit 104 to generate image data at the relatively low frame rate.

Then, the image data process unit 104 outputs the YUV data of the frame images of the live view image sent to the portable terminal 2 in accordance with the relatively low frame rate set by the frame rate setting unit 104b to the memory 102 (Step S352).

[Quality of Wireless Communication; Good]

When the quality of the wireless communication is relatively good (Step S24; Good), the transmission speed high enough can be ensured (for example, the transmission speed being about 10 Mbps or more), so that the process control unit 108b makes the frame rate setting unit 104b of the image data process unit 104 set a relatively high frame rate (for example, 30 fps) as the timings (intervals) to process YUV data of the frame images (Step S361). In addition, the process control unit 108b outputs a signal to the power supply unit 109 to instruct the power supply unit 109 to apply a voltage necessary for the generation process performed by the image data process unit 104 to generate image data at the relatively high frame rate.

Then, the image data process unit 104 outputs the YUV data of the frame images of the live view image sent to the portable terminal 2 in accordance with the relatively high frame rate set by the frame rate setting unit 104b to the memory 102 (Step S362).

After that, the transmission control unit 108a controls the wireless process unit 107 in such a way that the wireless process unit 107 obtains the YUV data of the frame images of the live view image, the YUV data being generated by the image data process unit 104, from the memory 102, and sends the YUV data to the portable terminal 2 via the predetermined wireless communication line (Step S27).

On the other hand, when determining that the wireless connection (wireless communication) with the portable terminal 2 is terminated (Step S23; YES), as is the case with the live view image transmission process of the first embodiment, the CPU of the central control unit 101 makes the image pickup unit 103 stop image pickup (Step S28), and then makes the power supply unit 109 stop power supply to the wireless process unit 107 (Step S29).

After that, as is the case with live view image transmission process of the first embodiment, the CPU of the central control unit 101 controls a not-shown timer unit so that a next start timing for the wireless process unit 107, namely, a timing to search for an external device, is set (Step S30).

The live view image transmission process is repeated until an end instruction to end the live view image transmission process or a start instruction to start another process (for example, the recorded video image transmission process) is inputted.

[Recorded Video Image Transmission Process]

In the following, the recorded video image transmission process is described with reference to FIG. 9.

Figure 9:
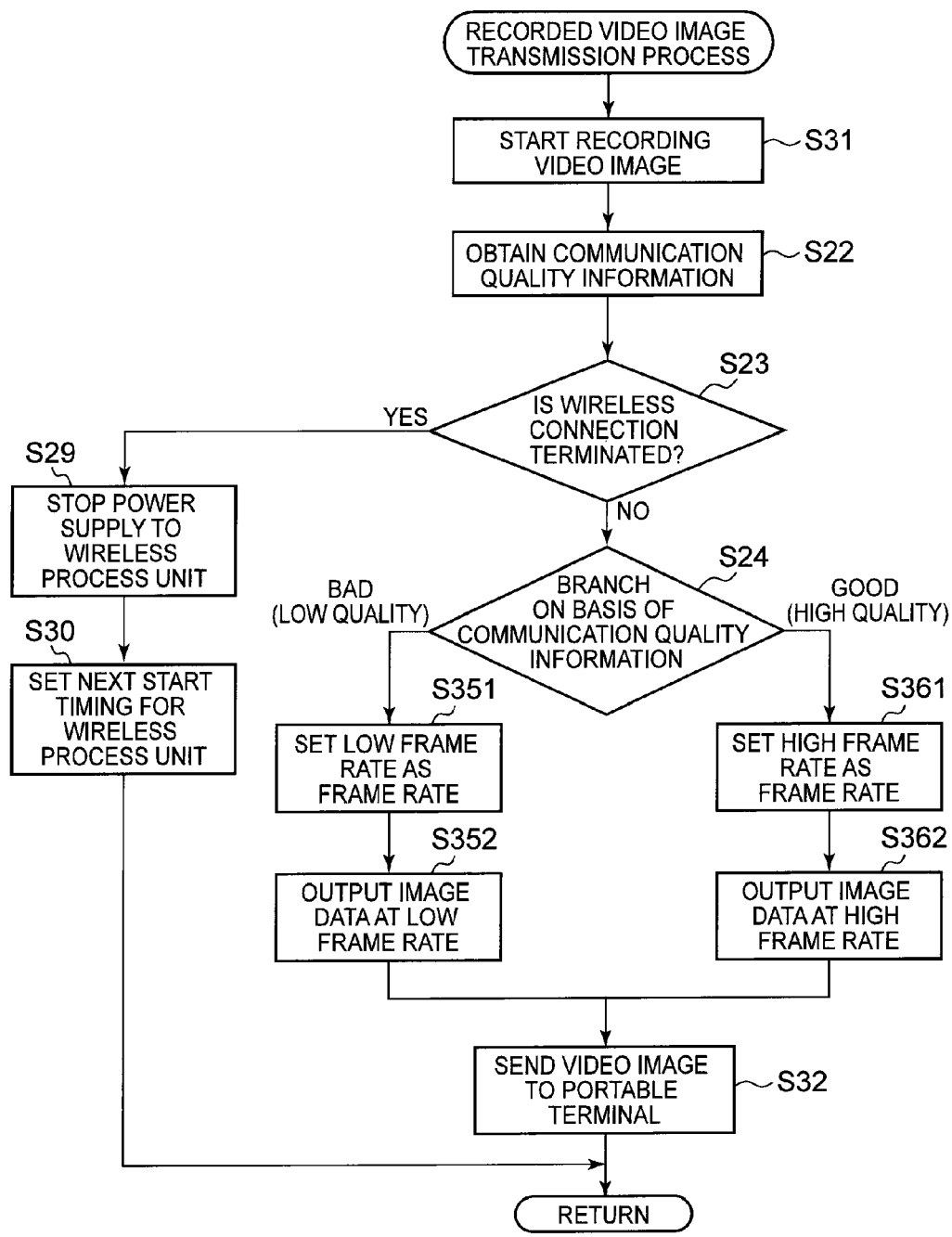
FIG. 9 is a flowchart showing an example of action of a recorded video image transmission process in the image transmission process performed by the image pickup system of the second embodiment.

FIG. 9 is a flowchart showing an example of action of the recorded video image transmission process.

The recorded video image transmission process described below is similar to the recorded video image transmission process of the first embodiment described above except for points described below. Hence, with respect to the similar points, detailed description is omitted.

As shown in FIG. 9, as is the case with the recorded video image transmission process of the first embodiment, Steps S21 to S23 are taken, and at Step S24, the CPU of the central control unit 101 makes the process branch on the basis of the communication quality information obtained by the communication quality obtaining unit 107b (Step S24).

[Quality of Wireless Communication; Bad]

When the quality of the wireless communication is relatively bad (Step S24; Bad), as is the case with the live view image transmission process, the process control unit 108b makes the frame rate setting unit 104b of the image data process unit 104 set a relatively low frame rate (for example, 15 fps) as the timings (intervals) to process YUV data of the frame images (Step S351). In addition, the process control unit 108b outputs a signal to the power supply unit 109 to instruct the power supply unit 109 to apply a voltage necessary for the generation process performed by the image data process unit 104 to generate image data at the relatively low frame rate.

Then, the image data process unit 104 outputs the YUV data of the frame images of the video image sent to the portable terminal 2 in accordance with the relatively low frame rate set by the frame rate setting unit 104b to the memory 102 (Step S352).

[Quality of Wireless Communication; Good]

When the quality of the wireless communication is relatively good (Step S24; Good), as is the case with the live view image transmission process, the process control unit 108b makes the frame rate setting unit 104b of the image data process unit 104 set a relatively high frame rate (for example, 30 fps) as the timings (intervals) to process YUV data of the frame images (Step S361). In addition, the process control unit 108b outputs a signal to the power supply unit 109 to instruct the power supply unit 109 to apply a voltage necessary for the generation process performed by the image data process unit 104 to generate image data at the relatively high frame rate.

Then, the image data process unit 104 outputs the YUV data of the frame images of the video image sent to the portable terminal 2 in accordance with the relatively high frame rate set by the frame rate setting unit 104b to the memory 102 (Step S362).

After that, the transmission control unit 108a controls the wireless process unit 107 in such a way that the wireless process unit 107 obtains the YUV data of the frame images of the video image, the YUV data being generated by the image data process unit 104, from the memory 102, and sends the YUV data to the portable terminal 2 via the predetermined wireless communication line (Step S32).

On the other hand, when determining that the wireless connection (wireless communication) with the portable terminal 2 is terminated (Step S23; YES), as is the case with the recorded video image transmission process of the first embodiment, the CPU of the central control unit 101 makes the power supply unit 109 stop power supply to the wireless process unit 107 (Step S29).

After that, as is the case with the recorded video image transmission process of the first embodiment, the CPU of the central control unit 101 controls a not-shown timer unit so that a next start timing for the wireless process unit 107, namely, a timing to search for an external device, is set (Step S30).

The recorded video image transmission process is repeated until an end instruction to end the recorded video image transmission process or a start instruction to start another process (for example, the live view image transmission process) is inputted.

As described above, as is the case with the image pickup system 100 of the first embodiment, according to the image pickup system of the second embodiment, the image pickup apparatus 301 can change the contents of the process performed by the image data process unit 104 with the quality of the communication taken into account. Accordingly, bad influence on image pickup can be reduced.

More specifically, changing the frame rate on the basis of the communication quality information, the frame rate being set by the frame rate setting process, can increase or reduce the data amounts of the frame images sent to the portable terminal 2, and reduce bad influence of the frame images on the wireless communication. Even if the frame rate at which the frame images are sent to the portable terminal 2 is low, a user can know a state of an image (a live view image or the like) being picked up to some extent, so that bad influence on image pickup can be reduced.

Furthermore, changing the color condition for output images (output image color condition) on the basis of the communication quality information, the color condition being set by the color condition setting process, can increase or reduce the data amounts of the frame images sent to the portable terminal 2, and reduce bad influence of the frame images on the wireless communication. Even if color information (for example, the number of colors) on the frame images sent to the portable terminal 2 is a little, a user can know a state of an image (a live view image or the like) being picked up to some extent, so that bad influence on image pickup can be reduced.

Furthermore, changing the content of the image process on the basis of the communication quality information, the content being set by the image process content setting process, can increase or reduce the data amounts of the frame images sent to the portable terminal 2, and reduce bad influence of the frame images on the wireless communication. Even if images each having a relatively small data amount (for example, contour images) are sent to the portable terminal 2, a user can know a state of an image (a live view image or the like) being picked up to some extent, so that bad influence on image pickup can be reduced.

Furthermore, in the second embodiment, the contents of the process performed by the image data process unit 104 are controlled according to the amount of power necessary to make the wireless communication stable. Hence, for example, even if the quality of the wireless communication is relatively bad, the amount of power required for stable wireless communication by the wireless process unit 107 can be ensured. Accordingly, bad influence on image pickup and wireless communication can be reduced.

In the second embodiment, the image data process unit 104 includes the frame rate setting unit 104b, the color condition setting unit 104c and the image process content setting unit 104d. However, the image data process unit 104 is not required to include all the frame rate setting unit 104b, the color condition setting unit 104c and the image process content setting unit 104d as long as the image data process unit 104 includes at least one of them.

Furthermore, the frame rate setting process, the color condition setting process and the image process content setting process may be appropriately changed on the basis of the communication quality information. That is, the frame rate setting process, the color condition setting process or the image process content setting process may be selected to be performed according to the amount of power to be saved, and accordingly, the frame rate setting process, the color condition setting process and the image process content setting process can be appropriately changed on the basis of the quality of wireless communication.

In the second embodiment, the image data process unit 104 sets the frame rate at which frame images are processed, and by extension, transferred (sent) to the portable terminal 2. Alternatively, the image pickup control unit 103c may set the image pickup frame rate to determine timings (intervals) to read frame images from the image pickup region of the electric image pickup unit 103b.

Third Embodiment

In the following, an image pickup system of a third embodiment is described.

An image pickup apparatus 401 (see FIG. 10) and a portable terminal 402 (see FIG. 11) which constitute the image pickup system of the third embodiment each have a Bluetooth® communication function, and are connected to each other so as to communicate information with each other.

First, the image pickup apparatus 401 is described with reference to FIG. 10.

Figure 10:
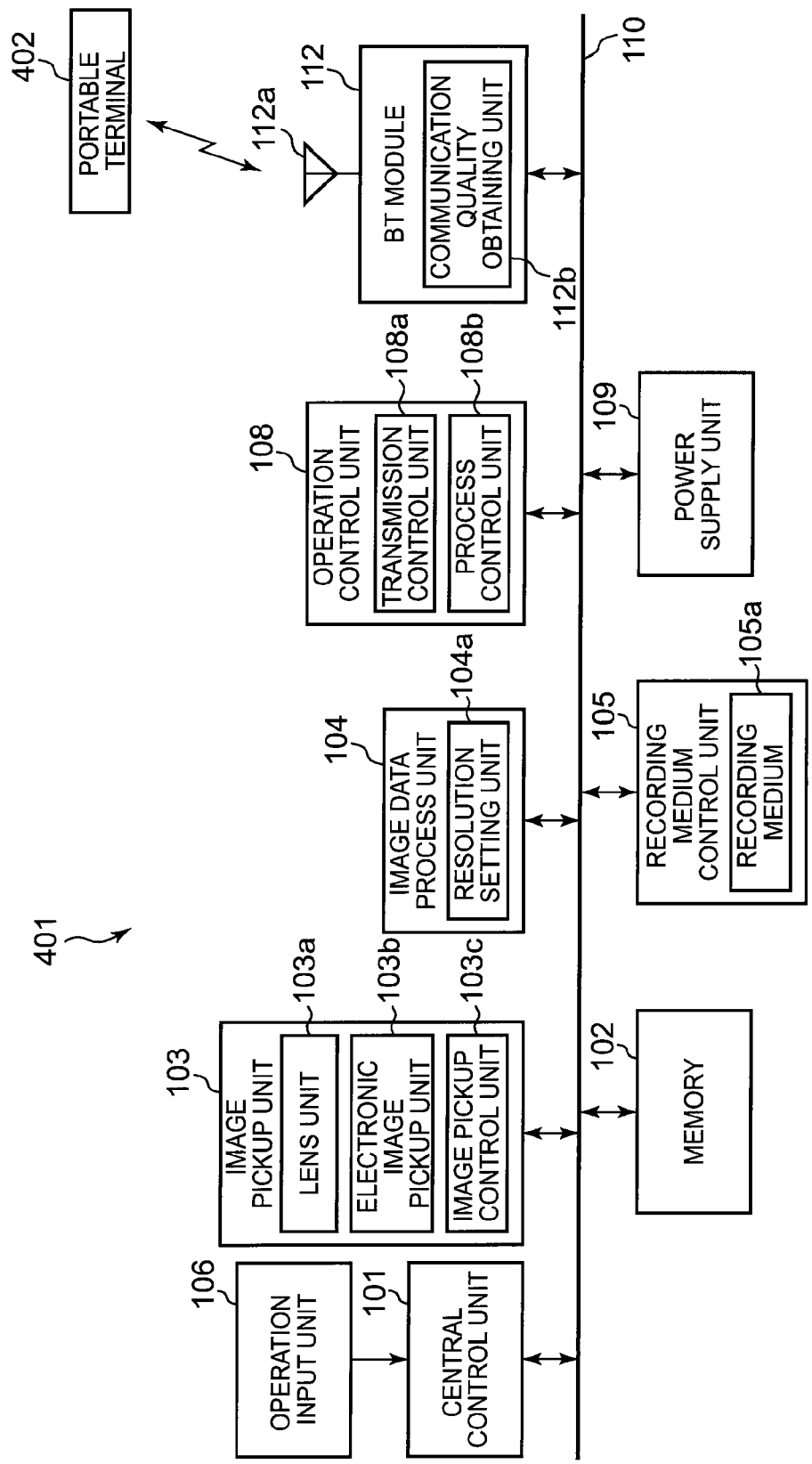
FIG. 10 is a block diagram schematically showing the configuration of an image pickup apparatus which constitutes an image pickup system of a third embodiment to which the present invention is applied.

FIG. 10 is a block diagram schematically showing the configuration of the image pickup apparatus 401, which constitutes the image pickup system of the third embodiment to which the present invention is applied.

As shown in FIG. 10, the image pickup apparatus 401 of the third embodiment includes a Bluetooth module (BT module) 112.

The image pickup apparatus 401 is similar to the image pickup apparatus 1 of the first embodiment and the image pickup apparatus 301 of the second embodiment except for points described blow. Hence, with respect to the similar points, detailed description is omitted.

The BT module 112 is a control module to establish Bluetooth communication with an external device (for example, the portable terminal 402) via a communication antenna 112a.

The BT module 112 performs a communication setting process called "pairing" in advance so as to exchange device information and authentication key data with a communication destination device (for example, the portable terminal 402) in a form of wireless signals. After that, the communication between the BT module 112 (image pickup apparatus 401) and the communication destination device is automatically or semi-automatically established or terminated without performing the communication setting process each time. For example, while the communication is automatically terminated when the image pickup apparatus 401 and the portable terminal 402 are apart from each other, thereby not being within an area where radio waves can reach from one to the other, the communication is automatically established when the image pickup apparatus 401 and the portable terminal 402 are close to each other, thereby within the area where radio waves can reach from one to the other. Alternatively, the communication may be semi-automatically established or terminated by an operation to establish communication or an operation to terminate communication.

The BT module 112 includes a communication quality obtaining unit 112b to obtain communication quality information on quality of wireless communication with an external device.

The communication quality obtaining unit 112b obtains a frame rate at which images are sent to an external device as the communication quality information. That is, the communication quality obtaining unit 112b obtains, for example, the transmission speed (for example, 10 Mbps) at predetermined intervals, the transmission speed which changes depending on the received signal strength (for example, RSSI) of radio waves received by the communication antenna 112a, and calculates and obtains, by the following Equation 1, a frame rate to send image data having predetermined resolution (for example, QVGA) in a predetermined format at the transmission speed to the portable terminal 402.

Frame Rate=Transmission Speed (bps)/8/Image Size  <Equation 1>

In Equation 1, "8" is a coefficient to calculate a bit rate in bytes. In addition, the "Image Size" is determined by the resolution and the format of image data. For example, in the case of RGB565, one pixel is expressed by two bytes, so that the image size of each frame image having resolution of QVGA is "320*240*2".

The process control unit 108b changes the resolution set by the resolution setting process to relatively low resolution (lower resolution) if the frame rate obtained by the communication quality obtaining unit 112b is less than a predetermined value. That is, the process control unit 108b repeatedly determines whether or not the frame rate obtained by the communication quality obtaining unit 112b is less than a predetermined value (for example, 7 fps) at predetermined intervals. When determining that the frame rate obtained by the communication quality obtaining unit 112b is less than the predetermined value, the process control unit 108b outputs a signal to the image data process unit 104 to instruct the image data process unit 104 to generate image data having relatively low resolution (for example, 96*72) so as to make the frame rate calculated by Equation 1 the predetermined value or more.

That is, if the frame rate is calculated by Equation 1, the frame rate changes depending on the transmission speed in a state in which the image size is fixed. For example, in a case where the transmission speed is 10 Mbps, and image data having resolution of QVGA is sent, the frame rate is about 8 fps, so that the image data can be sent to the portable terminal 402 at a frame rate of about 8 fps. However, in a case where the transmission speed is 1 Mbps, and the image data having resolution of QVGA is sent, the frame rate is about one-tenth of the above frame rate, namely, about 0.8 fps. Hence, the process control unit 108b changes the image size of each frame image to low resolution (for example, 96*72) so as to reduce the image size. Accordingly, even if the transmission speed is 1 Mbps, a frame rate of about 9 fps can be ensured.

Next, the portable terminal 402 is described with reference to FIG. 11.

Figure 11:
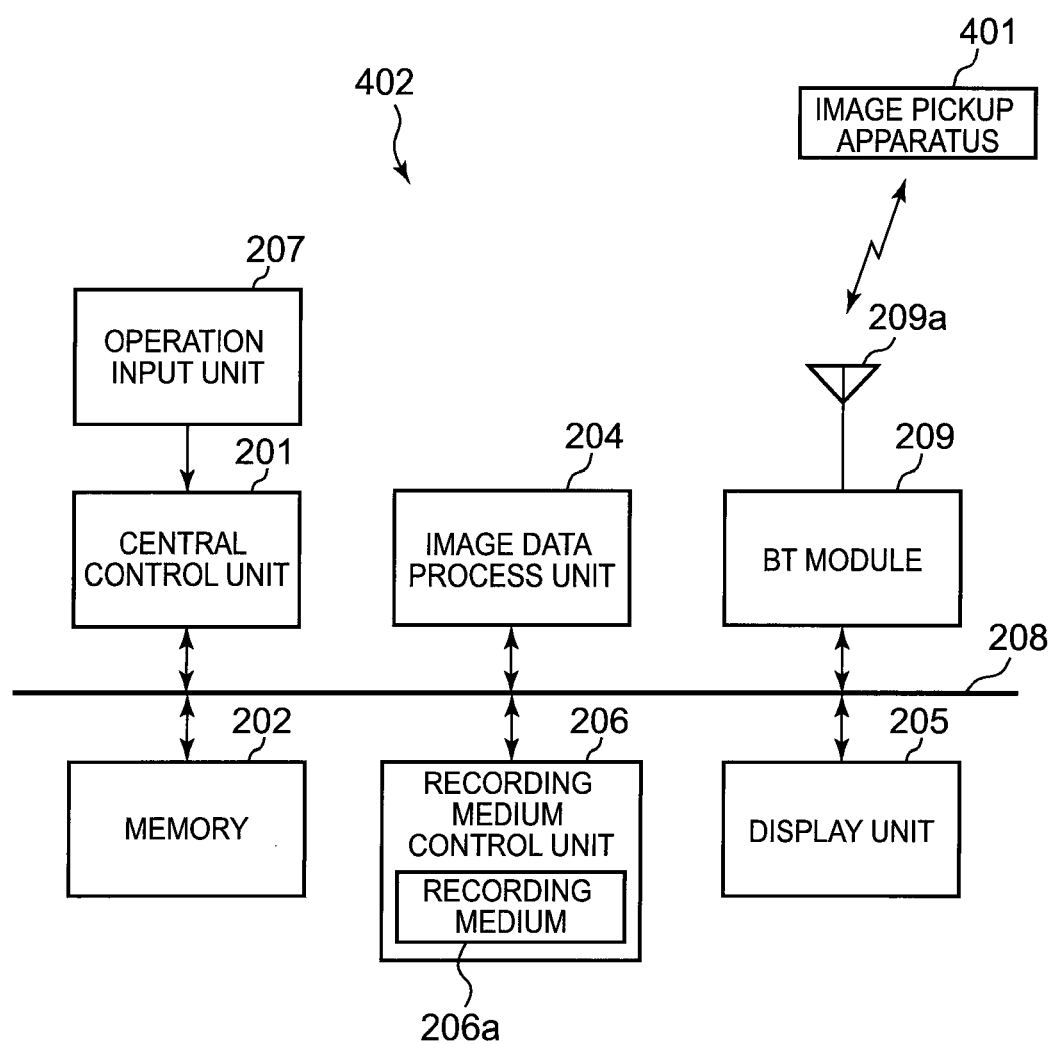
FIG. 11 is a block diagram schematically showing the configuration of a portable terminal which constitutes the image pickup system of the third embodiment.

FIG. 11 is a block diagram schematically showing the configuration of the portable terminal 402, which constitutes the image pickup system of the third embodiment to which the present invention is applied.

As shown in FIG. 11, the portable terminal 402 of the third embodiment includes a Bluetooth module (BT module) 209.

The portable terminal 402 is similar to the portable terminal 2 of the first embodiment and the portable terminal 2 of the second embodiment except for points described below. Hence, with respect to the similar points, detailed description is omitted.

The BT module 209 is a control module to establish Bluetooth communication with an external device (for example, the image pickup apparatus 401) via a communication antenna 209a. The BT module 209 has a similar function to that of the BT module 112 of the image pickup apparatus 401, and performs a communication setting process called "pairing" in advance so as to exchange device information and authentication key data with a communication destination device (for example, the image pickup apparatus 401) in a form of wireless signals. After that, the communication between the BT module 209 (portable terminal 402) and the communication destination device is automatically or semi-automatically established or terminated without performing the communication setting process each time.

Next, an image transmission process performed by the image pickup system of the third embodiment is described with reference to FIG. 12.

Figure 12:
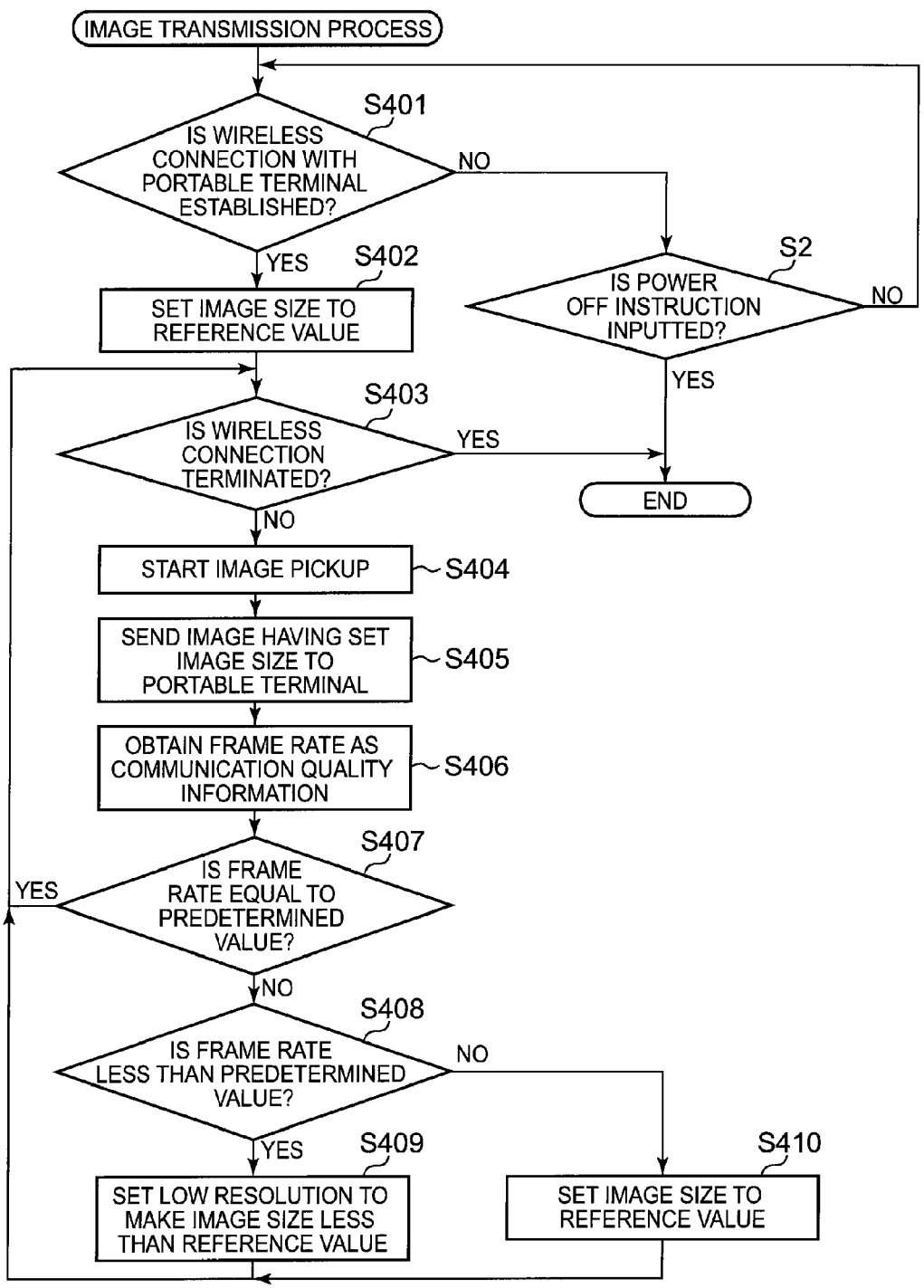
FIG. 12 is a flowchart showing an example of action of an image transmission process performed by the image pickup system of the third embodiment.

FIG. 12 is a flowchart showing an example of action of the image transmission process performed by the image pickup system of the third embodiment.

The image transmission process performed by the image pickup system of the third embodiment is a process performed to pick up a live view image or to record a video image.

That is, as is the case with the image transmission process of the first embodiment, in the image pickup system of the third embodiment, the CPU of the central control unit 101 of the image pickup apparatus 401 determines whether or not the image pickup apparatus 401 is connected to the portable terminal 402 by the BT module 112 connected to the BT module 209 to establish wireless communication (Step S401).

When determining that the image pickup apparatus 401 is not connected to the portable terminal 402 to establish wireless communication (Step S401; NO), the CPU of the central control unit 101 determines whether or not a power OFF instruction corresponding to an OFF operation made by a user with the power button of the operation input unit 106 is inputted (Step S2).

When determining that the power OFF instruction is not inputted (Step S2; NO), the CPU of the central control unit 101 returns to Step S401, and repeats Step S401 at predetermined intervals (Step S401).

On the other hand, when the CPU of the central control unit 101 determines that the image pickup apparatus 401 is connected to the portable terminal 402 to establish wireless communication (Step S401; YES), the resolution setting unit 104a of the image data process unit 104 sets the image size (resolution) of frame images sent to the portable terminal 402 to a reference value (for example, the QVGA size) (Step S402).

After that, the CPU of the central control unit 101 determines whether or not the wireless connection (wireless communication) with the portable terminal 402 established by the BT module 112 connected to the BT module 209 is terminated (Step S403).

When the CPU of the central control unit 101 determines that the wireless connection with the portable terminal 402 is not terminated (Step S403; NO), the image pickup unit 103 starts picking up an image (a live view image or the like) (Step S404).

That is, the image pickup control unit 103c reads two-dimensional signals into which optical images formed by the lens unit 103a are converted by the electronic image pickup unit 103b from the image pickup region of the electronic image pickup unit 103b at a predetermined image pickup frame rate one screen by one screen so as to generate frame images of a live view image.

Then, the image data process unit 104 reduces YUV data of the frame images of the live view image horizontally and vertically in accordance with the image size (for example, resolution of QVGA) set by the resolution setting unit 104a, and then the transmission control unit 108a sends the generated YUV data of the frame images from the BT module 112 to the portable terminal 402 (Step S405).

Next, the communication quality obtaining unit 107b obtains a frame rate at which images are sent to the portable terminal 402 as the communication quality information on the quality of the wireless communication between the BT module 112 and the BT module 209 of the portable terminal 402 (Step S406). More specifically, the communication quality obtaining unit 107b calculates and obtains a frame rate by Equation 1 on the basis of the image size of the YUV data of the frame images sent from the BT module 112 to the portable terminal 402 and the transmission speed thereof.

Next, the process control unit 108b determines whether or not the frame rate obtained by the communication quality obtaining unit 112b is equal to a predetermined (preset) value (for example, 7 fps) (Step S407).

When determining that the frame rate is not equal to the predetermined value (Step S407; NO), the process control unit 108b determines whether or not the frame rate is less than the predetermined value (Step S408).

On the other hand, when the process control unit 108b determines that the frame rate is equal to the predetermined value (Step S407; YES), the CPU of the central control unit 101 returns to Step S403, and controls execution of the following steps. That is, the image size of the frame images sent to the portable terminal 402 is kept being set to the reference value.

When determining that the frame rate is less than the predetermined value (Step S408; YES), the process control unit 108b makes the resolution setting unit 104a of the image data process unit 104 set the resolution for the frame images to relatively low resolution (for example, 96*72) so as to make the image size less than the reference value (Step S409). Accordingly, even if the transmission speed is 1 Mbps, the frame rate calculated by Equation 1 is equal to the predetermined value or more.

On the other hand, when determining that the frame rate is not less than the predetermined value (Step S408; NO), the process control unit 108b makes the resolution setting unit 104a of the image data process unit 104 set the resolution for the frame images to certain resolution (for example, QVGA) so as to make the image size the reference value (Step S410). Here, as long as the predetermined value as the frame rate can be ensured, the process control unit 108b may make the resolution setting unit 104a set the resolution for the frame images to certain resolution (for example, VGA) which makes the image size more than the reference value.

After that, the CPU of the central control unit 101 returns to Step S403, and controls execution of the following steps.

The above-described steps are repeated until the CPU of the central control unit 101 determines that the wireless connection with the portable terminal 402 is terminated (Step S403; YES). That is, appropriately changing the image size depending on the transmission speed prevents the frame rate from decreasing.

When the CPU of the central control unit 101 determines that the wireless connection with the portable terminal 402 is terminated (Step S403; YES), the image transmission process ends.

As described above, as is the case with the image pickup system 100 of the first embodiment, according to the image pickup system of the third embodiment, the image pickup apparatus 401 can change the contents of the process performed by the image data process unit 104 with the quality of the communication taken into account. Accordingly, bad influence on image pickup can be reduced.

More specifically, if the frame rate is less than a predetermined value, the resolution for output images (output image resolution) set by the resolution setting process is changed to relatively low resolution (lower resolution), which can reduce the data amounts of the frame images sent to the portable terminal 402, thereby preventing the frame rate from decreasing, and reduce bad influence of the frame images on the wireless communication. Even if the resolution for the frame images sent to the portable terminal 402 is low, a user can know a state of an image (a live view image or the like) being picked up to some extent, so that bad influence on image pickup can be reduced.

Furthermore, in the third embodiment, the image pickup apparatus 401 and the portable terminal 402 are connected to each other by Bluetooth so as to communicate information with each other. Accordingly, the wireless communication can save power, and the contents of the process performed by the image data process unit 104 are hardly restricted by the quality of the wireless communication.

In the third embodiment, the resolution set by the resolution setting process is changed taking the frame rate as a reference. However, for example, the received signal strength (for example, RSSI) of radio waves received by the communication antenna 112a may be taken as the reference. That is, because the received signal strength (for example, RSSI) is correlative to the transmission speed, the resolution set by the resolution setting process may be changed to relatively low resolution (lower resolution) if the received signal strength decreases, for example.

Fourth Embodiment

In the following, an image pickup system of a fourth embodiment is described.

An image pickup apparatus 501 which constitutes the image pickup system of the fourth embodiment is similar to the image pickup apparatus 1 of the first embodiment and the image pickup apparatus 301 of the second embodiment except for points described below. Hence, with respect to the similar points, detailed description is omitted.

Figure 13:
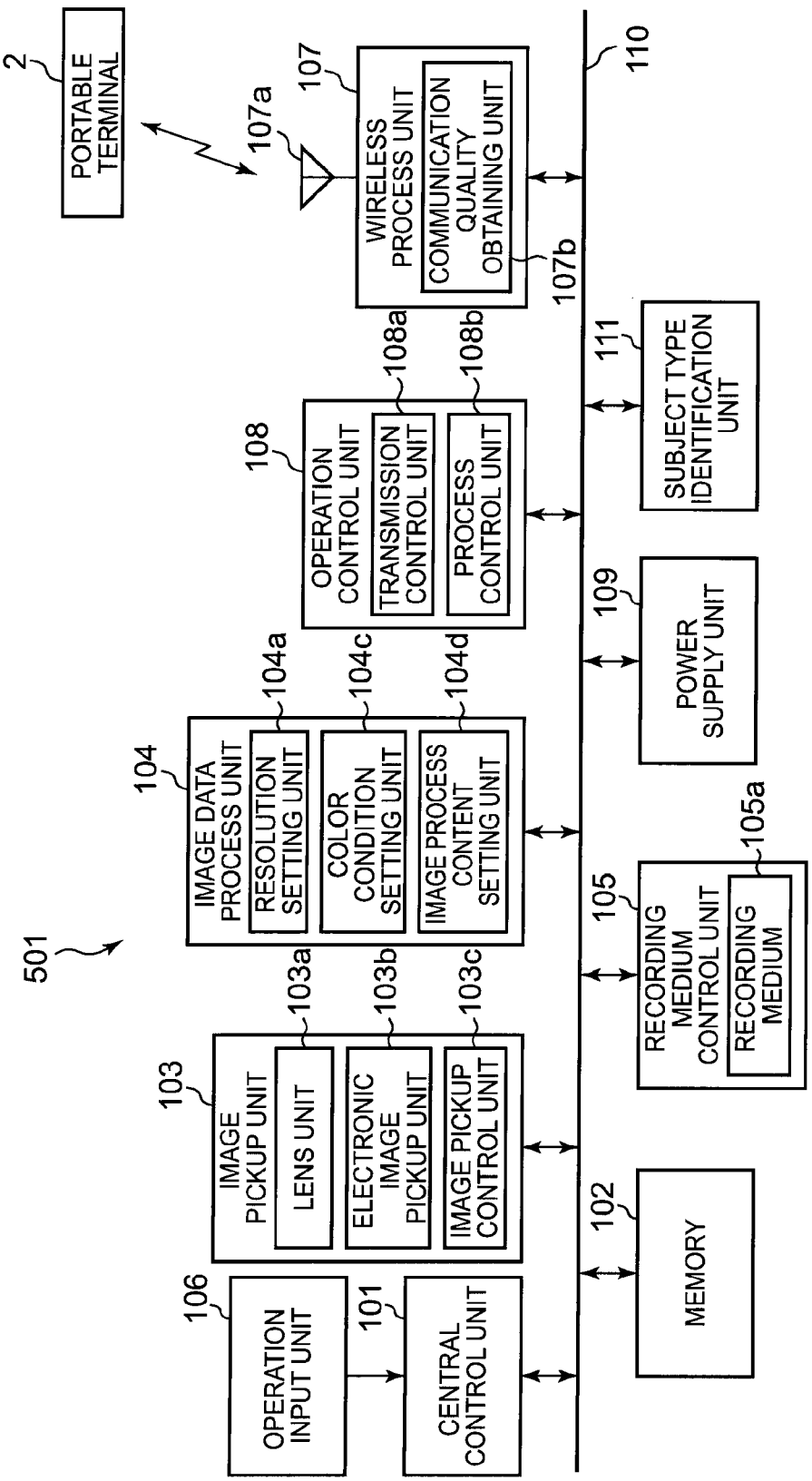
FIG. 13 is a block diagram schematically showing the configuration of an image pickup apparatus which constitutes an image pickup system of a fourth embodiment to which the present invention is applied.

FIG. 13 is a block diagram schematically showing the configuration of the image pickup apparatus 501, which constitutes the image pickup system of the fourth embodiment to which the present invention is applied.

As shown in FIG. 13, the image pickup apparatus 501 of the fourth embodiment includes a subject type identification unit 111 in addition to the central control unit 101, the memory 102, the image pickup unit 103, the image data process unit 104, the recording medium control unit 105, the operation input unit 106, the wireless process unit 107, the action control unit 108 and the power supply unit 109.

The subject type identification unit 111 constitutes an identification unit to identify the type of a subject, images of which are picked up by the image pickup unit 103.

More specifically, for example, if an automatic shooting mode is set on the basis of a predetermined operation made by a user with the operation input unit 106, the automatic shooting mode in which a shooting scene is automatically recognized, the subject type identification unit 111 obtains image data (YUV data) of frame images of a live view image, the frame images being successively generated by the image pickup unit 103 picking up an image (a live view image or the like) of a subject, from the memory 102, and detects a target subject from the frame images by using a predetermined image recognition technology, such as face detection, edge detection or feature extraction. Then, the subject type identification unit 111 identifies the type of the detected target subject as a "person", a "landscape" or a "night view", for example. The face detection, the edge detection and the feature extraction are well-known technologies, and hence detailed description thereof is omitted.

As another example, if a user's desired shooting mode (for example, a mode in which the "person" is the target subject, a mode in which the "landscape" is the target subject or a mode in which the "night view" is the target subject) is set on the basis of a predetermined operation made by a user with the operation input unit 106, the subject type identification unit 111 identifies the type (for example, the "person", the "landscape" or the "night view") of the target subject in accordance with the set shooting mode.

The image data process unit 104 includes the resolution setting unit 104*a*, the color condition setting unit 104*c* and the image process content setting unit 104*d*.

The resolution setting unit 104*a* is similar to that of the first embodiment, and sets resolution (for example, a VGA size or a QVGA size) to determine magnification to horizontally and vertically enlarge or reduce YUV data of frame images of a live view image, for example. The image data process unit 104 generates YUV data of frame images in accordance with the resolution set by the resolution setting unit 104*a*, and outputs the generated image data having the set resolution to the memory 102.

The color setting unit 104*c* is similar to that of the second embodiment, and sets a color condition (for example, the number of colors (color number)) used for the image process performed on YUV data of frame images of a live view image, the frame images being successively transferred from the image pickup unit 103, for example. The image data process unit 104 generates YUV data of frame images (for example, monochrome images each having a relatively small number of colors) in accordance with the color condition set by the color condition setting unit 104*c*, and outputs the generated image data to the memory 102.

The image process content setting unit 104*d* is similar to that of the second embodiment, and sets a content (for example, edge extraction) of the image process performed on YUV data of frame images of a live view image, the frame images being successively transferred from the image pickup unit 103, for example. Then, the image data process unit 104 generates YUV data of frame images (for example, contour images after edge extraction) in accordance with the content of the image process set by the image process content setting unit 104*d*, and outputs the generated image data to the memory 102.

The process control unit 108*b* of the action control unit 108 controls the contents of the image process performed by the image data process unit 104 in accordance with the type of a subject identified by the subject type identification unit 111. More specifically, if the quality of the wireless communication related to the communication quality information obtained by the communication quality obtaining unit 107*b* is relatively bad, namely, if the transmission speed high enough cannot be ensured, the process control unit 108*b* controls the contents of the image process performed by the image data process unit 104 in accordance with the type of a subject identified by the subject type identification unit 111.

For example, if the subject type identification unit 111 identifies the type of a subject as the "person", it is considered that what a user would like to know is where the "person" exists in frame images, so that the process control unit 108*b* performs control in such a way that contour images which show a contour part of the subject are generated by the image data process unit 104. More specifically, the process control unit 108*b* outputs a signal to the power supply unit 109 to instruct the power supply unit 109 to apply a voltage necessary for the generation process performed by the image data process unit 104 to generate image data of images each having a relatively small data amount (for example, contour images), and also outputs a signal to the image data process unit 104 to instruct the image data process unit 104 to generate image data of images each having the relatively small data amount.

As another example, if the subject type identification unit 111 identifies the type of a subject as the "landscape", it is considered that what a user would like to know is the overall composition of frame images, so that the process control unit 108*b* performs control in such a way that the resolution set by the resolution setting process performed by the image data process unit 104 is relatively low resolution. More specifically, the process control unit 108*b* outputs a signal to the power supply unit 109 to instruct the power supply unit 109 to apply a voltage necessary for the generation process performed by the image data process unit 104 to generate image data of images each having relatively low resolution (for example, images each having the QVGA size), and also outputs a signal to the image data process unit 104 to instruct the image data process unit 104 to generate image data of images each having the relatively low resolution.

As another example, if the subject type identification unit 111 identifies the type of a subject as the "night view", it is considered that what a user would like to do is to distinguish between light portions and dark portions in frame images, so that the process control unit 108*b* performs control in such a way that the number of colors set by the color condition setting process performed by the image data process unit 104 is a relatively small number. More specifically, the process control unit 108*b* outputs a signal to the power supply unit 109 to instruct the power supply unit 109 to apply a voltage necessary for the generation process performed by the image data process unit 104 to generate image data of images each having a relatively small number of colors (for example, monochrome images), and also outputs a signal to the image data process unit 104 to instruct the image data process unit 104 to generate image data of images each having the relatively small number of colors.

If the type of a subject identified by the subject type identification unit 111 is not any of them described above, the process control unit 108*b* performs control in such a way that the image data process unit 104 performs another type of the image process to reduce the data amounts of frame images sent to the portable terminal 2.

Next, an image transmission process performed by the image pickup system of the fourth embodiment is described with reference to FIGS. 4, 14 and 15.

The image transmission process performed by the image pickup system of the fourth embodiment is similar to the image transmission process performed by the image pickup system 100 of the first embodiment except for points described below. Hence, with respect to the similar points, detailed description is omitted.

That is, as is the case with the image transmission process of the first embodiment, when determining that a recording start instruction to record a video image is not detected (Step S3; NO), the CPU of the central control unit controls execution of the live view image transmission process (see FIG. 14) (Step S5).

[Live View Image Transmission Process]

In the following, the live view image transmission process is described with reference to FIGS. 14 and 15.

Figure 14:
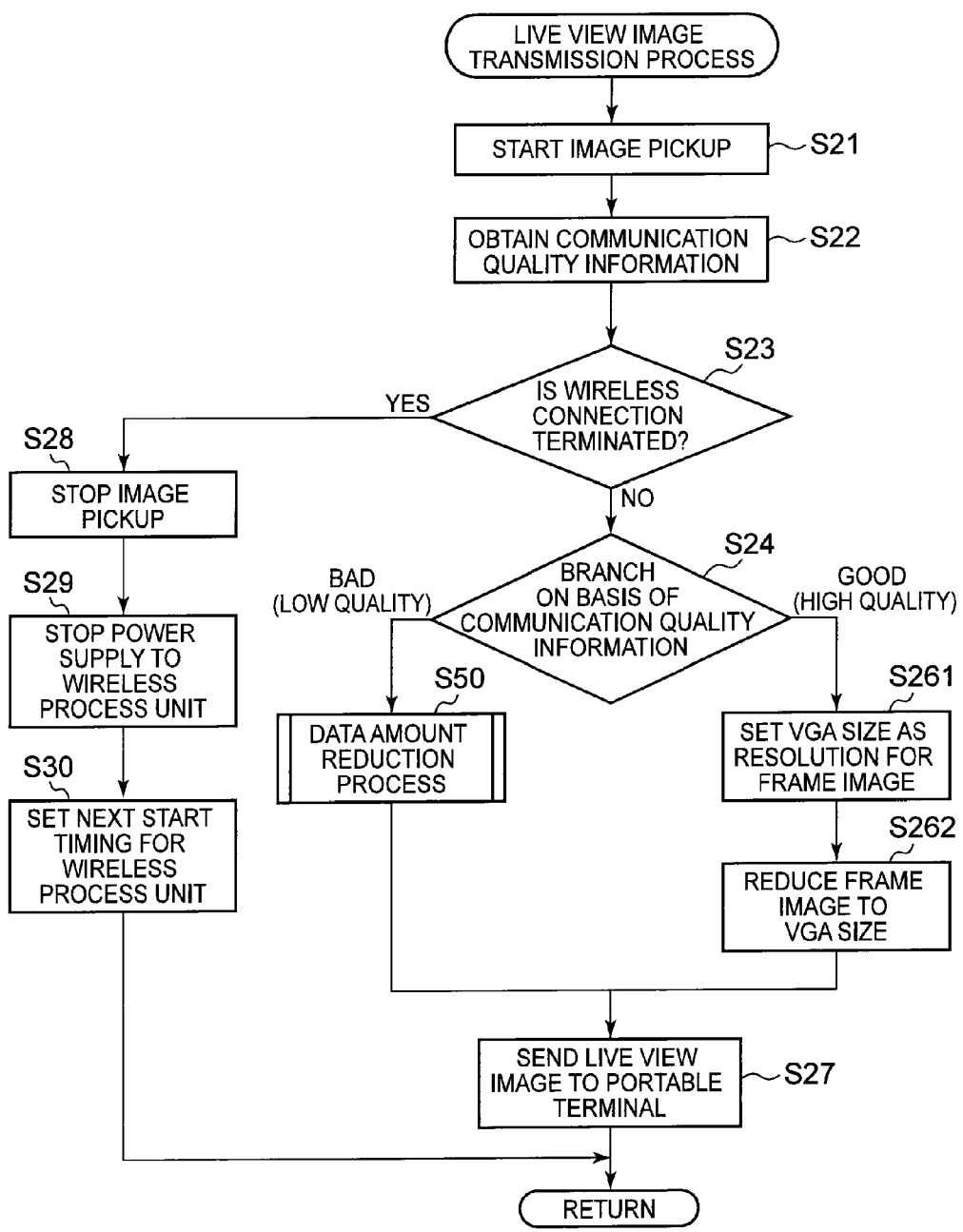
FIG. 14 is a flowchart showing an example of action of a live view image transmission process in an image transmission process performed by the image pickup system of the fourth embodiment.

FIG. 14 is a flowchart showing an example of action of the live view image transmission process. FIG. 15 is a flowchart showing an example of action of a data amount reduction process in the live view image transmission process.

The live view image transmission process described blow is similar to the live view image transmission process performed by the image pickup system 100 of the first embodiment except for points described below. Hence, with respect to the similar points, detailed description is omitted.

As shown in FIG. 14, as is the case with the live view image transmission process of the first embodiment, Steps S21 to S23 are taken, and at Step S24, the CPU of the central control unit 101 makes the process branch on the basis of the communication quality information obtained by the communication quality obtaining unit 107b (Step S24).

[Quality of Wireless Communication; Bad]

When the quality of the wireless communication is relatively bad (Step S24; Bad), the transmission speed high enough cannot be ensured (for example, the transmission speed being less than about 10 Mbps), which requires reducing the data amounts of frame images sent to the portable terminal 2. Hence, the image pickup apparatus 501 performs the data amount reduction process (see FIG. 15) to reduce the data amounts of frame images sent to the portable terminal 2 (Step S50).

In the following, the data amount reduction process is described in detail with reference to FIG. 15.

Figure 15:
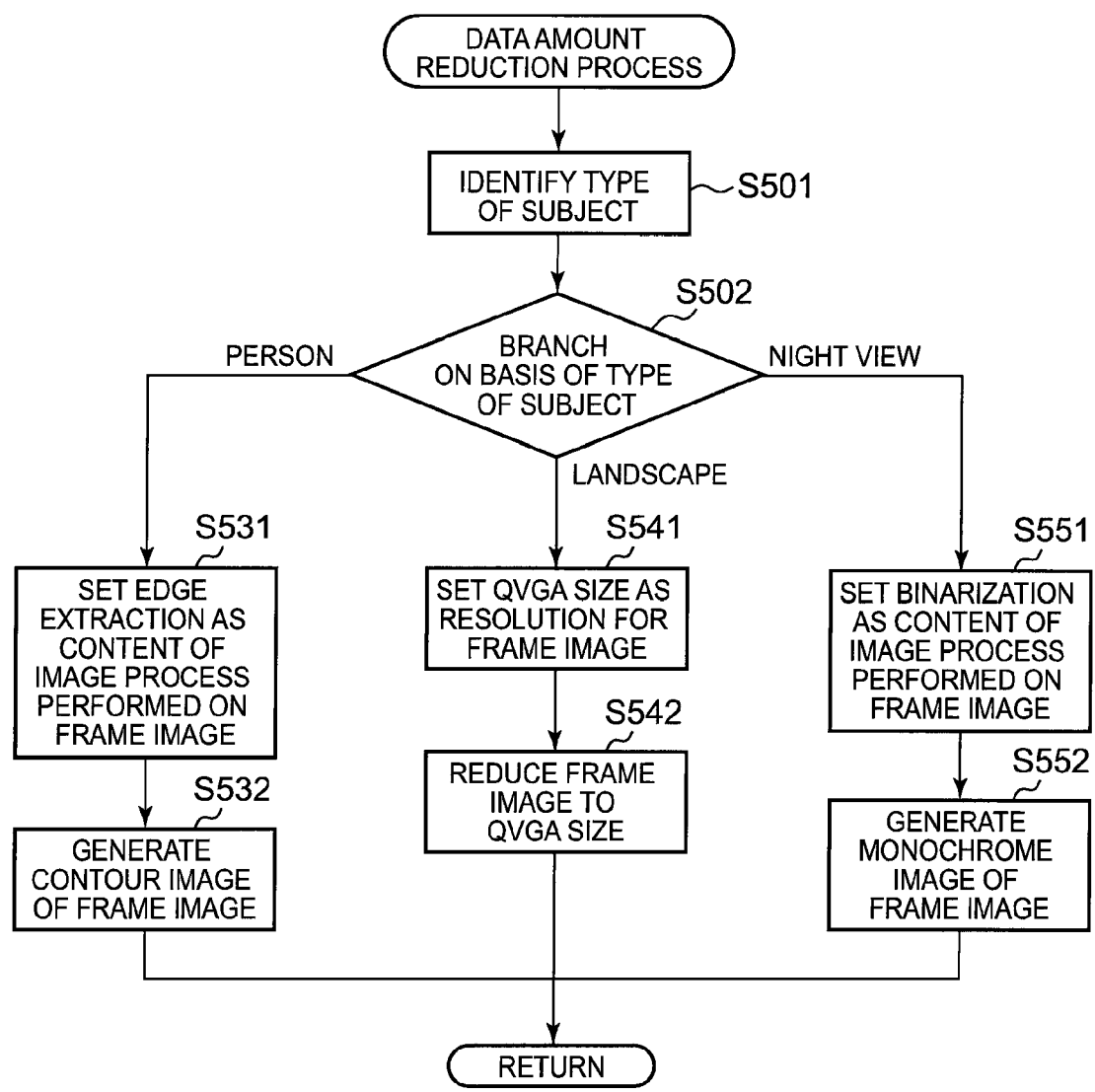
FIG. 15 is a flowchart showing an example of action of a data amount reduction process in the live view image transmission process shown in FIG. 14.

As shown in FIG. 15, first, the subject type identification unit 111 identifies the type of a subject, images of which are picked up by the image pickup unit 103 (Step S501). More specifically, for example, the subject type identification unit 111 identifies the type (for example, the "person", the "landscape" or the "night view") of the subject in accordance with a user's desired shooting mode (for example, a mode in which the "person" is the target subject, a mode in which the "landscape" is the target subject or a mode in which the "night view" is the target subject) set on the basis of a predetermined operation made by a user with the operation input unit 106.

Next, the process control unit 108b makes the process branch on the basis of the type of the subject identified by the subject type identification unit 111 (Step S502). More specifically, the process control unit 108b proceeds to Step S531 when the type of the subject is identified as the "person" (Step S502; Person), proceeds to Step S541 when the type of the subject is identified as the "landscape" (Step S502; Landscape), and proceeds to Step S551 when the type of the subject is identified as the "night view" (Step S502; Night View).

[Type of Subject; Person]

When the type of the subject is identified as the "person" (Step S502; Person) under the quality of the wireless communication being relatively bad, what is necessary is to let a user recognize where the "person" exists in the frame images, so that the process control unit 108b makes the image process content setting unit 104b of the image data process unit 104 set edge extraction as the content of the image process performed on YUV data of the frame images (Step S531). In addition, the process control unit 108b outputs a signal to the power supply unit 109 to instruct the power supply unit 109 to apply a voltage necessary for edge extraction set by the image process content setting unit 104d.

Then, the image data process unit 104 performs edge extraction on the YUV data of the frame images of the live view image in accordance with the content of the image process set by the image process content setting unit 104d to generate image data of contour images, and outputs the generated image data to the memory 102 (Step S532).

[Type of Subject; Landscape]

When the type of the subject is identified as the "landscape" (Step S502; Landscape) under the quality of the wireless communication being relatively bad, what is necessary is to let a user recognize the overall composition of the frame images, so that the process control unit 108b makes the image resolution setting unit 104a of the image data process unit 104 set the QVGA size as the resolution for YUV data of the frame images (Step S541). In addition, the process control unit 108b outputs a signal to the power supply unit 109 to instruct the power supply unit 109 to apply a voltage necessary for the generation process to generate image data having the relatively low resolution (QVGA size) set by the resolution setting unit 104a.

Then, the image data process unit 104 reduces the YUV data of the frame images of the live view image horizontally and vertically in accordance with the resolution (QVGA size) set by the resolution setting unit 104a so as to generate YUV data having the QVGA size, and outputs the generated image data to the memory 102 (Step S542)

[Type of Subject; Night View]

When the type of the subject is identified as the "night view" (Step S502; Night View) under the quality of the wireless communication being relatively bad, what is necessary is to let a user recognize light portions and dark portions in the frame images, so that the process control unit 108b makes the color condition setting unit 104c of the image data process unit 104 set binarization (a relatively small number of colors) as the color condition and as the content of the image process performed on YUV data of the frame images to (Step S551). In addition, the process control unit 108b outputs a signal to the power supply unit 109 to instruct the power supply unit 109 to apply a voltage necessary for binarization set by the color condition setting unit 104c.

Then, the image data process unit 104 performs binarization on the YUV data of the frame images of the live view image in accordance with the color condition set by the color condition setting unit 104c to generate image data of monochrome images, and outputs the generated image data to the memory 102 (Step S552).

Then, the data amount reduction process ends, and the CPU of the central control unit 101 proceeds to Step S27 (see FIG. 14).

[Quality of Wireless Communication; Good]

When the quality of the wireless communication is relatively good (Step S24; Good), as is the case with the live view image transmission process of the first embodiment, the process control unit 108b makes the resolution setting unit 104a of the image data process unit 104 set the VGA size as the resolution for YUV data of frame images (Step S261). Then, the image data process unit 104 reduces the YUV data of the frame images of the live view image horizontally and vertically in accordance with the resolution (VGA size) set by the resolution setting unit 104a so as to generate YUV data having the VGA size, and outputs the generated image data to the memory 102 (Step S262).

After that, the CPU of the central control unit 101 proceeds to Step S27.

At Step S27, as is the case with the live view image transmission process of the first embodiment, the transmission control unit 108a controls the wireless process unit 107 in such a way that the wireless process unit 107 obtains the YUV data of the frame images having the set resolution of the live view image, the YUV data being generated by the image data process unit 104, from the memory 102, and sends the YUV data to the portable terminal 2 via the predetermined wireless communication line (Step S27)

On the other hand, when determining that the wireless connection (wireless communication) with the portable terminal 2 is terminated (Step S23; YES), as is the case with the live view image transmission process of the first embodiment, the CPU of the central control unit 101 makes the image pickup unit 103 stop image pickup (Step S28), and then makes the power source 109 stop power supply to the wireless process unit 107 (Step S29).

After that, as is the case with the live view image transmission process of the first embodiment, the CPU of the central control unit 101 controls a not-shown timer unit so that a next start timing for the wireless process unit 107, namely, a timing to search for an external device, is set (Step S30).

The live view image transmission process is repeated until an end instruction to end the live view image transmission process or a start instruction to start another process (for example, the recorded video image transmission process) is inputted.

As described above, as is the case with the image pickup system 100 of the first embodiment, according to the image pickup system of the fourth embodiment, the image pickup apparatus 501 can change the contents of the process performed by the image data process unit 104 with the quality of the communication taken into account. Accordingly, bad influence on image pickup can be reduced. The image pickup apparatus 501 controls the contents of the process performed by the image data process unit 104 in accordance with the type of a subject. Accordingly, even if the quality of the wireless communication is relatively bad, a user can know a state of an image (a live view image or the like) being picked up to some extent, so that bad influence on image pickup, such as a user missing the perfect shot, can be reduced.

More specifically, if the type of a subject is identified as the "person", the image data process unit 104 generates image data of contour images showing a contour part of the subject, so that a user can recognize where the "person" exists in the frame images while the data amounts of the frame images sent to the portable terminal 2 are reduced. Furthermore, if the type of a subject is identified as the "landscape", the image data process unit 104 generates image data of images having relatively low resolution, so that a user can recognize the overall composition of frame images while the data amounts of the frame images sent to the portable terminal 2 are reduced. Furthermore, if the type of a subject is identified as the "night view", the image data process unit 104 generates image data of images each having a relatively small number of colors, so that a user can recognize light portions and dark portions in frame images while the data amounts of the frame images sent to the portable terminal 2 are reduced.

In the fourth embodiment, the image data process unit 104 includes the resolution setting unit 104*a*, the color condition setting unit 104*c* and the image process content setting unit 104*d*. However, the image data process unit 104 is not required to include all the resolution setting unit 104*a*, the color condition setting unit 104*c* and the image process content setting unit 104*d* as long as the image data process unit 104 includes at least one of them.

The present invention is not limited to the first to fourth embodiments described above, and hence various modifications and design changes can be made without departing from the scope of the present invention. For example, in the embodiments, a wireless communication line is described as a predetermined communication line. However, the predetermined communication line may be a cable communication line to connect the image pickup apparatus 1 (301, 401, 501) and the portable terminal (402) via a cable or the like to establish communication therebetween. The present invention is applicable to the case too because it is considered that, in this case, the amount of noise changes depending on conditions (for example, the length, the thickness and/or the material) of the cable connecting the image pickup apparatus 1 and the portable terminal 2, which exerts bad influence on the quality of the communication.

The configuration of the image pickup apparatus 1 (301, 401, 501) described in each embodiment is not a limitation but an example. Furthermore, although the image pickup apparatus 1 (301, 401, 501) is described as an image process apparatus, this is not a limitation but an example.

Furthermore, in the embodiments, the control performed on the image data process unit 104 is described. Alternatively, control may be performed on the image pickup control unit 103*c* of the image pickup unit 103.

That is, with the quality of the communication taken into account, the image pickup (light reception) area of the electric image pickup unit 103*b* itself may be controlled, the area where image pickup (light reception) is performed, the strength of gain control and/or the sensitivity may be adjusted, or intervals to flush image data themselves may be adjusted.

Accordingly, bad influence on image pickup can be reduced without intricate control on the image data process unit 104.

The control on the image pickup control unit 103*c* (control on an action content of an image pickup unit) may be performed instead of or in addition to the above-described control on the image data process unit 104.

Furthermore, in the embodiments, the control performed by the image pickup apparatus 1 (301, 401, 501) is mainly described. However, the portable terminal 2 (402) may perform control mainly.

That is, the wireless process unit 203 (or the BT module 209) may receive images from the image pickup apparatus 1, the images on which a predetermined process has been performed, obtain the communication quality information on the quality of the communication between the portable terminal 2 and the image pickup apparatus 1 via a predetermined communication line, and send a control instruction to change at least one of the contents of action (action content) of image pickup performed by the image pickup apparatus 1 and the contents (process content) of the process performed on the images picked up by the image pickup unit 103 of the image pickup apparatus 1 to the image pickup apparatus 1 via the predetermined communication line on the communication quality information.

Accordingly, the contents of action of the image pickup control unit 103*c* of the image pickup apparatus 1 at the time of image pickup and/or the contents of the process performed by the image data process unit 104 can be changed with the quality of the communication taken into account, and bad influence on image pickup can be reduced.

Furthermore, in the embodiments, functions as the transmission control unit, the obtaining unit and the process control unit are realized by the transmission control unit 108*a*, the communication quality obtaining unit 107*b* and the process control unit 108*b* driven under the control of the central control unit 101, respectively. However, this is not a limitation but an example, and hence these functions may be realized by the CPU of the central control unit 101 executing a predetermined program or the like.

That is, a program including a transmission control process routine, an obtaining process routine and a process control process routine is stored in a program memory (not shown) where programs are stored. The transmission control process routine makes the CPU of the central control unit 101 function as a transmission control unit to make a communication unit send images successively processed by a process unit to an external device via a predetermined communication line. In addition, the obtaining process routine makes the CPU of the central control unit 101 function as an obtaining unit to obtain communication quality information on the quality of communication with the external device established by the communication unit via the predetermined communication line. In addition, the process control process routine makes the CPU of the central control unit 101 function as a process control unit to control at least one of the contents of action of an image pickup unit and the contents of the process performed by the process unit on the basis of the communication quality information obtained by the obtaining unit.

Furthermore, as a computer readable storage medium to store the program to perform the above-described processes, other than a ROM and a hard disk, a nonvolatile memory, such as a flash memory, and a portable recording medium, such as a CD-ROM, can be used. Furthermore, a carrier wave can be used as a medium which provides data of the program via a communication line.

Several embodiments of the present invention are described above. However, the scope of the present invention is not limited to the embodiments, and includes the scope of the appended claims and their equivalents.

What is claimed is:

1. An image pickup apparatus comprising:
   a process unit which successively processes images picked up by an image pickup unit;
   a process control unit which performs control of at least one of (i) an action content of the image pickup unit and (ii) a process content of the process unit;
   a color condition setting unit which performs a color condition setting process to set an output image color condition;
   a communication unit which is connected to an external device via a predetermined communication line so as to establish communication with the external device;
   a transmission control unit which makes the communication unit send the images successively processed by the process unit to the external device via the predetermined communication line;
   an obtaining unit which obtains communication quality information on a quality of the communication with the external device established by the communication unit via the predetermined communication line; and
   a first determination unit which determines, based on the communication quality information obtained by the obtaining unit, whether or not to reduce a data amount of image data of the images to be sent to the external device,
   wherein when the first determination unit determines to reduce the data amount, the process control unit performs the control in such a way that a color number set by the color condition setting process is a relatively small number, thereby controlling the process unit to reduce the data amount of the image data of the images to be successively processed.

2. The image pickup apparatus according to claim 1, further comprising a second determination unit which determines, based on the communication quality information obtained by the obtaining unit, whether or not to stop power supply to the communication unit,
   wherein when the second determination unit determines not to stop the power supply to the communication unit, the first determination unit determines, based on the communication quality information, whether or not to reduce the data amount of the image data of the images to be sent to the external device.

3. The image pickup apparatus according to claim 2, further comprising a power supply control unit which, when the second determination unit determines to stop the power supply to the communication unit, performs control to stop the power supply to the communication unit.

4. The image pickup apparatus according to claim 3, wherein the power supply control unit sets a next start timing after performing the control the stop the power supply to the communication unit.

5. The image pickup apparatus according to claim 4, further comprising a communication control unit which controls the communication unit to search for the external device so as to establish the communication with the external device, when the next start timing arrives and the power supply control unit performs the control to supply power to the communication unit.

6. An image pickup method for an image pickup apparatus including a communication unit and a process unit which successively processes images picked up by an image pickup unit, the image pickup method comprising:
   controlling of at least one of (i) an action content of the image pickup unit and (ii) a process content of the process unit, wherein the controlling controls the process unit to perform a color condition setting process to set an output image color condition;
   connecting the communication unit to an external device via a predetermined communication line so as to establish communication with the external device;
   controlling the communication unit to send the images successively processed by the process unit to the external device via the predetermined communication line;
   obtaining communication quality information on a quality of the communication with the external device established by the communication unit via the predetermined communication line; and
   determining, based on the communication quality information, whether or not to reduce a data amount of image data of the images to be sent to the external device,
   wherein when it is determined to reduce the data amount, the controlling is performed in such a way that a color number set by the color condition setting process is a relatively small number, thereby controlling the process unit to reduce the data amount of the image data of the images to be successively processed.

7. The image pickup method according to claim 6, further comprising:
   determining, based on the communication quality information, whether or not to stop power supply to the communication unit,
   wherein when it is determined not to stop the power supply to the communication unit, the determining is performed based on the communication quality information whether or not to reduce the data amount of the image data of the images to be sent to the external device.

8. The image pickup method according to claim 7, further comprising:
performing control to stop the power supply to the communication unit, when it is determined to stop the power supply to the communication unit.

9. The image pickup method according to claim 8, further comprising:
setting a next start timing after performing the control the stop the power supply to the communication unit.

10. The image pickup method according to claim 9, further comprising:
controlling the communication unit to search for the external device so as to establish the communication with the external device, when the next start timing arrives and control is performed to supply power to the communication unit.

11. A non-transitory computer-readable storage medium having stored thereon a program that is executable by a computer of an image pickup apparatus including a communication unit and a process unit which successively processes images picked up by an image pickup unit, the program being executable by the computer to cause the image pickup apparatus to perform operations comprising:
controlling of at least one of (i) an action content of the image pickup unit and (ii) a process content of the process unit, wherein the controlling controls the process unit to perform a color condition setting process to set an output image color condition;
connecting the communication unit to an external device via a predetermined communication line so as to establish communication with the external device;
controlling the communication unit to send the images successively processed by the process unit to the external device via the predetermined communication line;
obtaining communication quality information on a quality of the communication with the external device established by the communication unit via the predetermined communication line; and
determining, based on the communication quality information, whether or not to reduce a data amount of image data of the images to be sent to the external device,
wherein when it is determined to reduce the data amount, the controlling is performed in such a way that a color number set by the color condition setting process is a relatively small number, thereby controlling the process unit to reduce the data amount of the image data of the images to be successively processed.

12. The non-transitory computer-readable storage medium according to claim 11, the operations further comprising:
determining, based on the communication quality information, whether or not to stop power supply to the communication unit,
wherein when it is determined not to stop the power supply to the communication unit, the determining is performed based on the communication quality information whether or not to reduce the data amount of the image data of the images to be sent to the external device.

13. The non-transitory computer-readable storage medium according to claim 12, the operations further comprising:
performing control to stop the power supply to the communication unit, when it is determined to stop the power supply to the communication unit.

14. The non-transitory computer-readable storage medium according to claim 13, the operations further comprising:
setting a next start timing after performing the control the stop the power supply to the communication unit.

15. The non-transitory computer-readable storage medium according to claim 14, the operations further comprising:
controlling the communication unit to search for the external device so as to establish the communication with the external device, when the next start timing arrives and control is performed to supply power to the communication unit.

\* \* \* \* \*